: US007881376B2

United States Patent
Iguchi et al.

(10) Patent No.: US 7,881,376 B2
(45) Date of Patent: Feb. 1, 2011

(54) MOTION COMPENSATION APPARATUS

(75) Inventors: Masayasu Iguchi, Nishinomiya (JP); Hiroaki Toida, Kadoma (JP); Toshiyasu Sugio, Osaka (JP)

(73) Assignee: Panasonic Corporation, Osaka (JP)

(*) Notice: Subject to any disclaimer, the term of this patent is extended or adjusted under 35 U.S.C. 154(b) by 1249 days.

(21) Appl. No.: 11/126,291

(22) Filed: May 11, 2005

(65) Prior Publication Data
US 2005/0254581 A1 Nov. 17, 2005

(30) Foreign Application Priority Data
May 14, 2004 (JP) .............................. 2004-145585

(51) Int. Cl.
H04N 7/12 (2006.01)
(52) U.S. Cl. ............................ 375/240.12; 375/240.14; 375/240.24; 375/240.25; 375/240.26
(58) Field of Classification Search ............ 375/240.01, 375/240.12, 240.14, 240.24–240.26
See application file for complete search history.

(56) References Cited

U.S. PATENT DOCUMENTS
5,398,072 A * 3/1995 Auld ...................... 375/240.25
6,078,619 A * 6/2000 Monro et al. ............ 375/240
7,050,504 B2 * 5/2006 Joch et al. .............. 375/240.26

FOREIGN PATENT DOCUMENTS
JP 10-215457 8/1998
JP 11-298903 10/1999
WO 2004/079916 9/2004

OTHER PUBLICATIONS
Wiegand et al., Draft ITU-T Recommendation and Final Standard of Joint Video specification ("Draft Errata List with Revision-Marked Corrections for H.264/AVC") Joint Video Team (JVT) of ISO/IEC MPEG & ITU-T VCEG (ISO/IEC JTC1/SC29/WG11 and ITU-T SG16 Q.6) 9th Meeting: San Diego, California, Sep. 2-5, 2003., pp. 122-125.

* cited by examiner

Primary Examiner—Joseph G Ustaris
Assistant Examiner—Geepy Pe
(74) Attorney, Agent, or Firm—Wenderoth, Lind & Ponack, L.L.P.

(57) ABSTRACT

A motion compensation apparatus reduces the number of pixels for reading out pixel data from the multi-frame memory, and realizes the reduction of transmission and motion compensation in sub-pixel precision pixel generation, for efficient motion compensation pixel generation. The motion compensation apparatus includes a frame memory transmission control unit which, with regard to a plurality of motion compensation blocks, transmits reference pixels required in motion compensation collectively or on a per motion compensation block basis, from a multi-frame memory which stores a reference picture used in inter-picture motion compensation prediction, to a local reference memory.

10 Claims, 22 Drawing Sheets

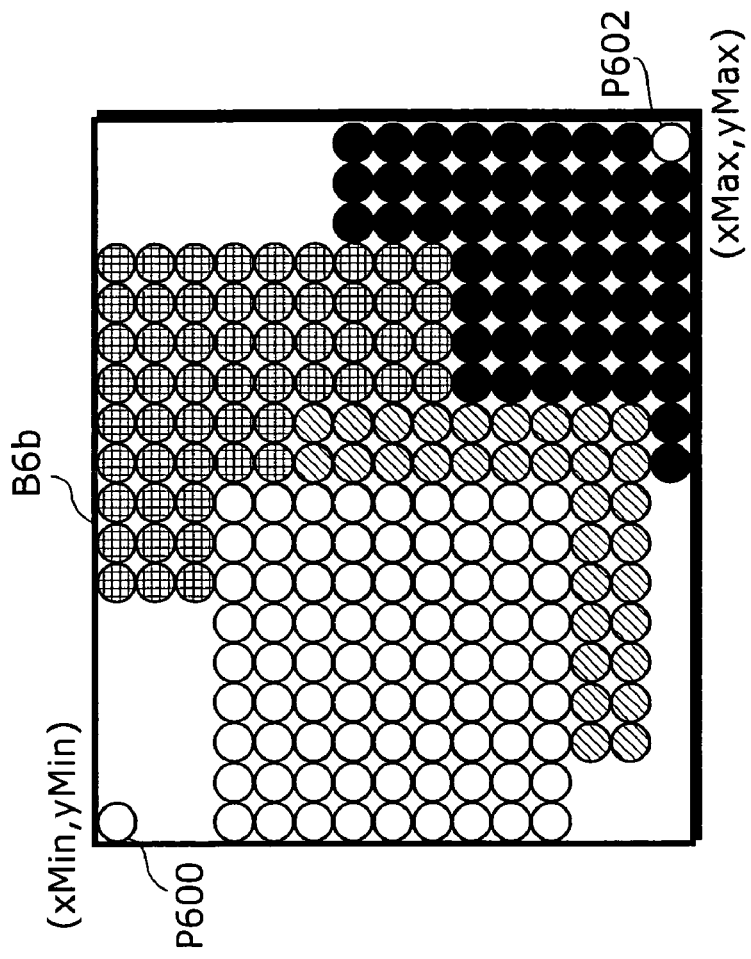
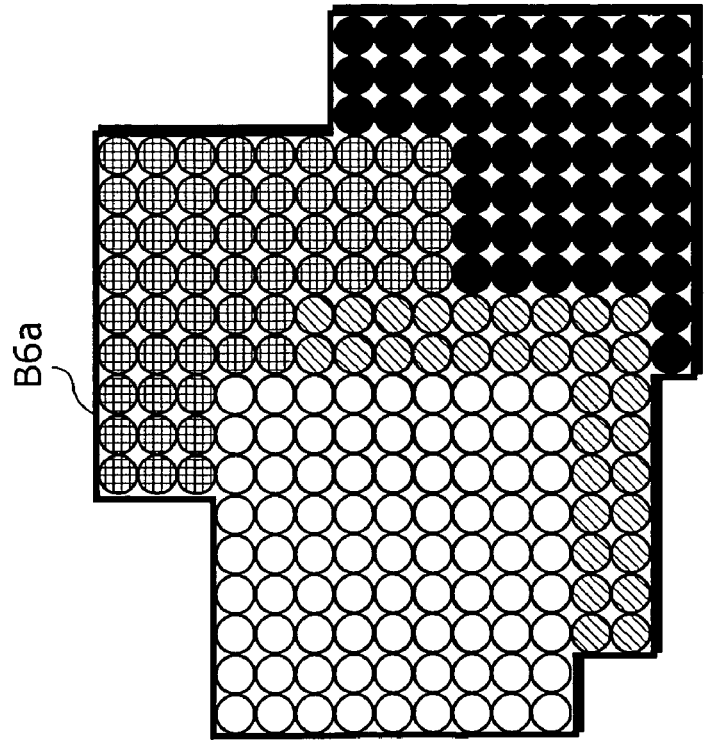

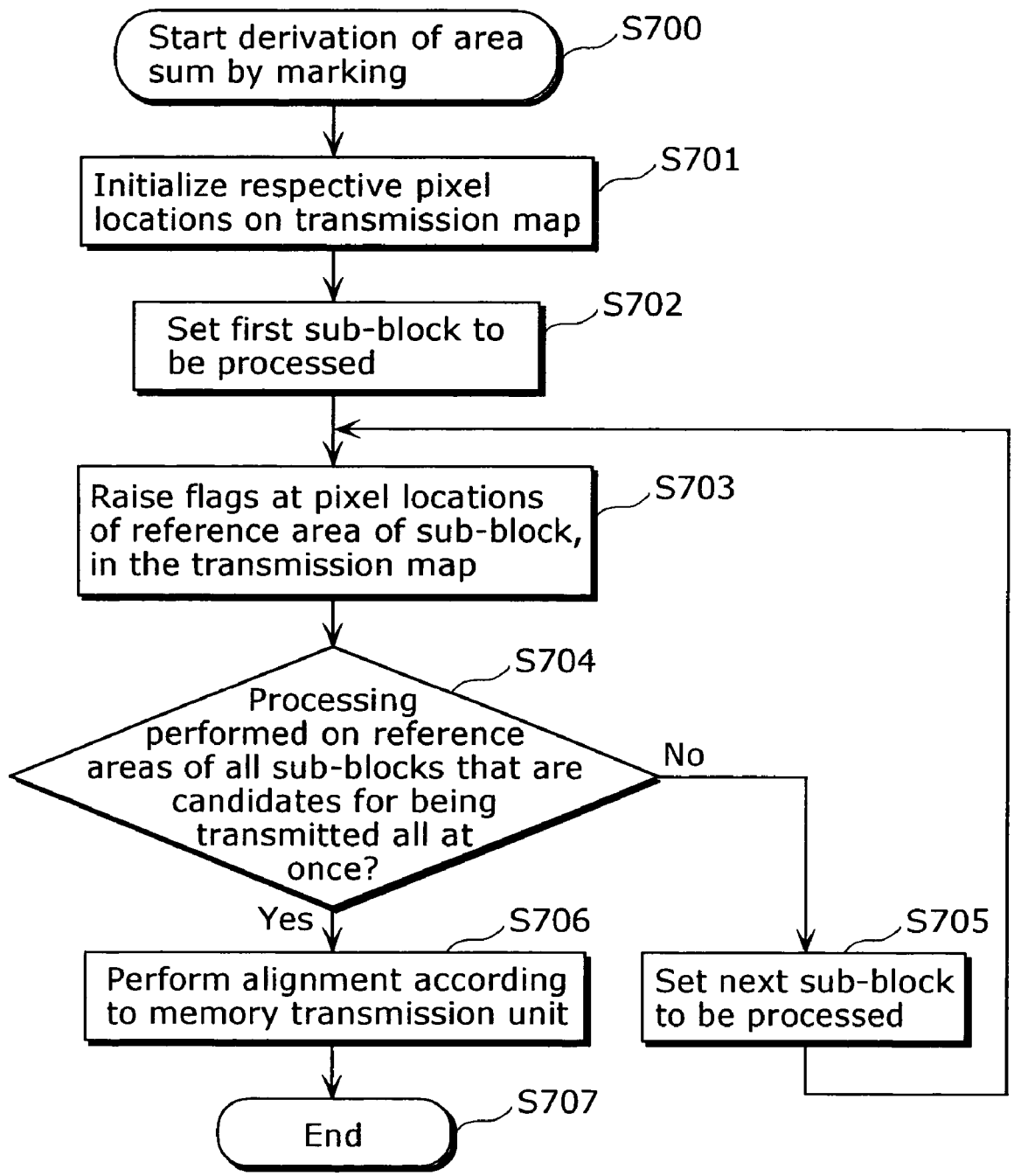

FIG. 14
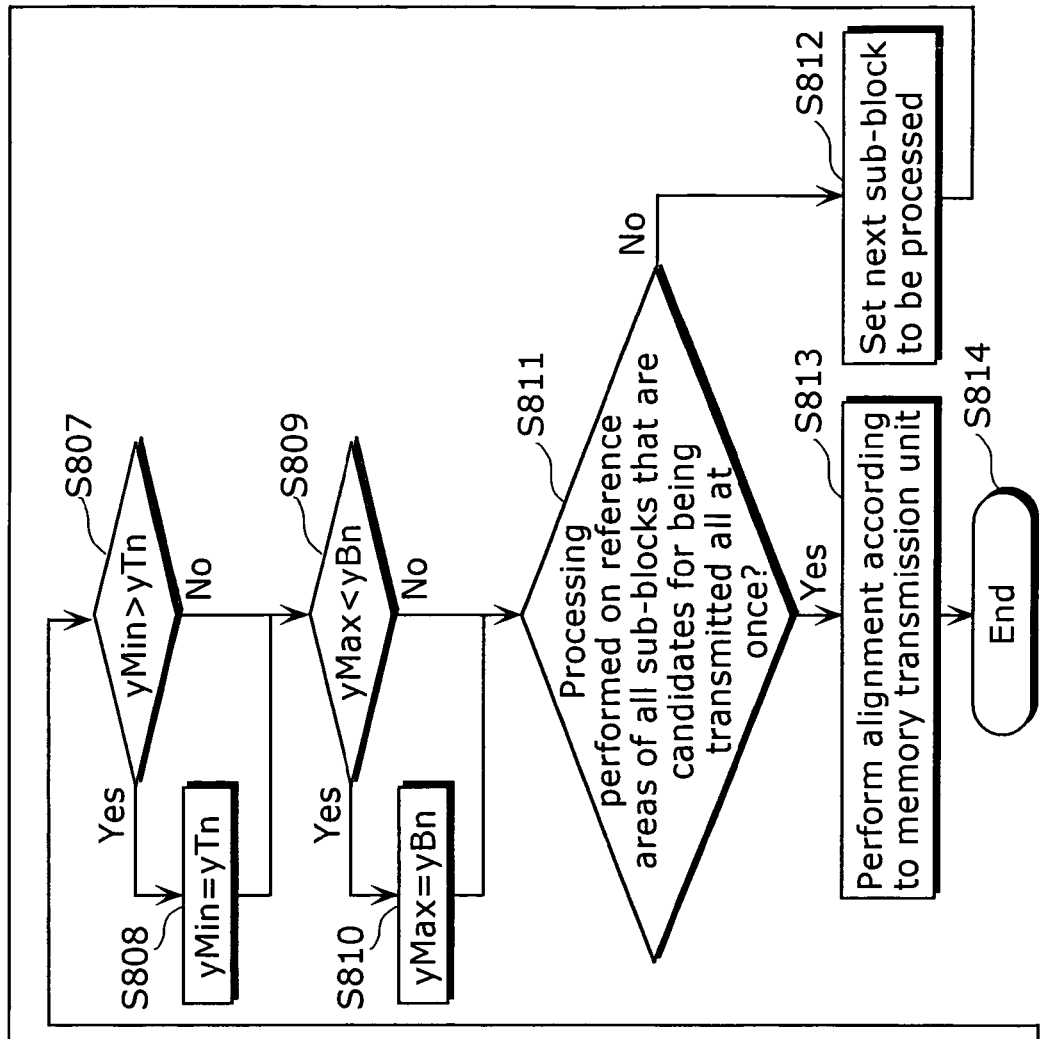
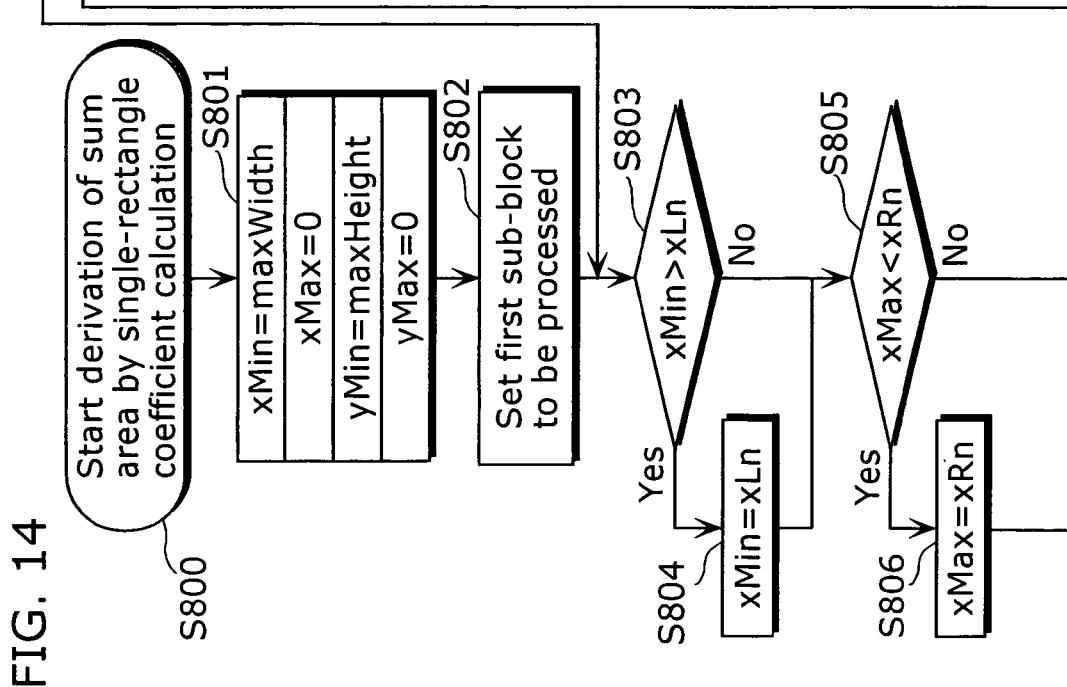

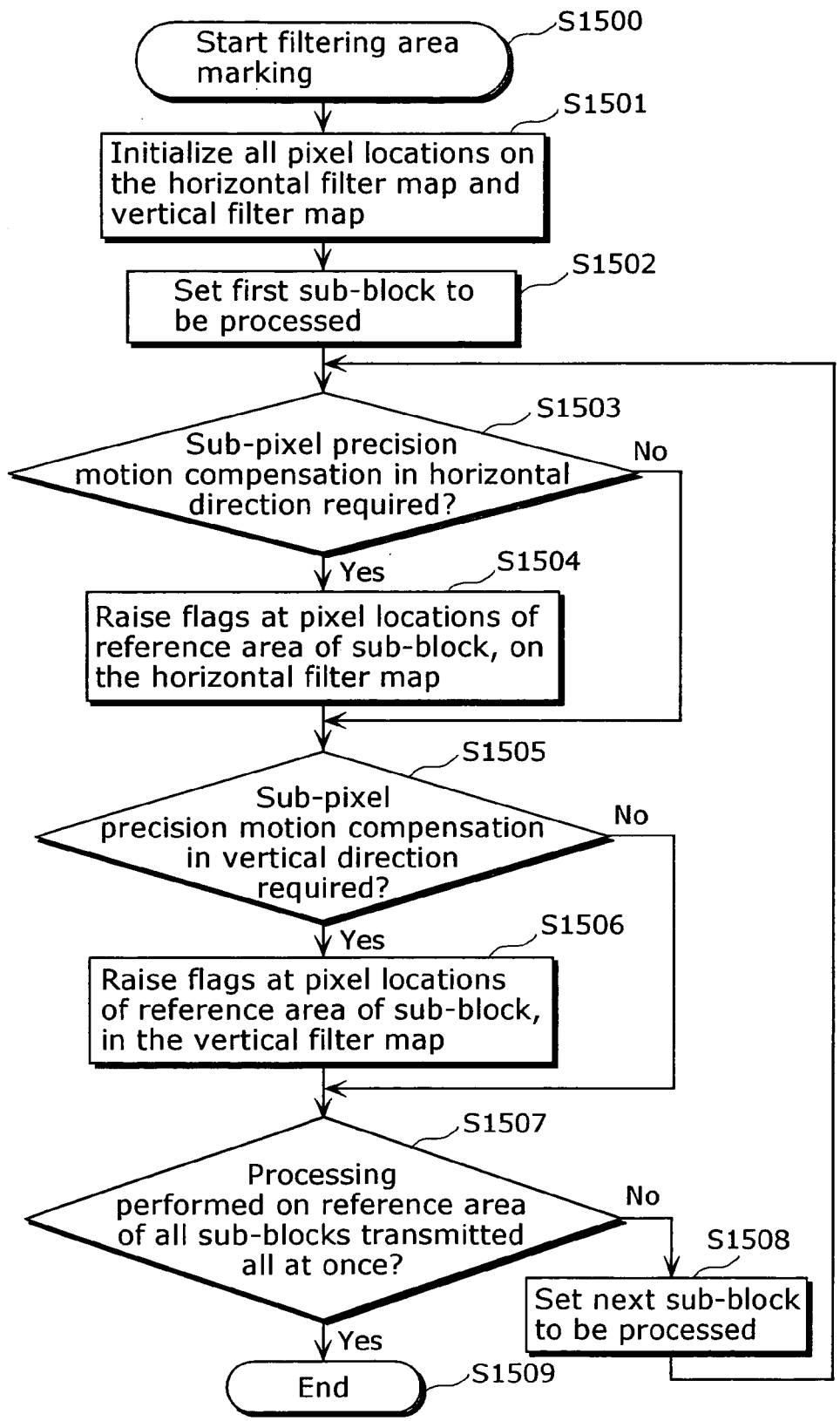

MOTION COMPENSATION APPARATUS

BACKGROUND OF THE INVENTION (1) Field of the Invention

The present invention relates to a motion compensation apparatus which performs inter-picture motion compensation prediction.

(2) Description of the Related Art

In recent years, unified handling of various media information such as image, sound, text, and so on, has become common with the development of multi-media applications. At this time, unified handling of media is made possible through the digitalization of all media. However, as digitalized images carry a massive amount of data, image information compression technology is indispensable for storage and transmission.

At the same time, standardization of compression technology is also important for the interoperation of compressed image data. Examples of standard specifications for image compression technology are the following: H.261 and H.263 of the International Telecommunication Union-Telecommunication Standardization Sector (ITU-T); Moving Picture Experts Group (MPEG)-1, MPEG-2, MPEG-4, and so on, of the International Organization for Standardization/International Electrotechnical Commission (ISO/IEC); and H.264 (MPEG-4AVC), which standardization is being promoted by the Joint Video Team (JVT) which is an ITU-T and MPEG tie-up.

In general, compression of information volume is carried out in the coding of moving pictures by reducing redundancy in the temporal direction and the spatial direction. Consequently, in inter-picture prediction coding which has the reduction of temporal redundancy as an objective, a picture in the forward or backward direction is referred to, motion estimation and predictive picture creation are carried out on a per block basis, and coding is performed on the difference between the obtained predictive picture and the picture to be coded. Here, "picture" is a term used to indicate a single image plane, and refers to a frame in the case of progressive images, and refers to a frame or a field in the case of interlaced images. Here, interlaced images refer to images in which one frame is made up of two temporally different fields. In the coding and decoding of interlaced images it is possible to process a single frame as a frame or as two fields, or process each block within the frame as a frame structure or field structure.

A picture on which intra-picture prediction coding is performed without a reference picture is called an I-picture. Furthermore, a picture on which inter-picture prediction coding is performed with reference to only one reference picture is called a P-picture. Furthermore, a picture on which inter-picture prediction coding can be performed with simultaneous reference to two reference pictures is called a B-picture. A B-picture can refer to a random combination of two pictures in the forward direction or backward direction. A reference image (reference picture) can be specified on a per macroblock basis, which is the basic unit for coding, and differentiated into a first reference picture which is the reference picture described ahead within a coded bit stream, and a second reference picture which is the reference picture described later. However, a condition in the coding of these pictures is that the pictures to be referred to must already be coded.

Motion compensation inter-picture prediction coding is used in the coding of a P-picture or a B-picture. Motion compensation inter-picture prediction coding is a coding method which applies motion compensation in inter-picture prediction coding. Motion compensation is a method which increases prediction precision and reduces data volume by estimating the amount of motion (hereinafter, referred to as "motion vector") for each part within a picture and performing prediction with consideration given to such amount of motion, and not simply predicting from the pixel value of the reference frame. For example, the motion vector of the picture to be coded is estimated and, by coding the predictive residual between the picture to be coded and the predictive value shifted by the amount of the motion vector, data volume is reduced. In this method, motion vectors are also coded and recorded, or transmitted, as the information of the motion vectors is required during decoding.

The motion vector is estimated on a per macroblock basis. Specifically, the motion vector is estimated by keeping the macroblock of the picture to be coded fixed, moving the macroblock of the reference picture within the search range, and finding the position of the reference block which is most similar to the base block.

FIG. 1 is a block diagram showing the structure of a conventional inter-picture prediction coding apparatus.

This inter-picture prediction coding apparatus includes a motion estimation unit 401, a multi-frame memory 402, a subtraction unit 403, a subtraction unit 404, a motion compensation unit 405, a coding unit 406, an addition unit 407, a motion vector memory 408, and a motion vector prediction unit 409.

The motion estimation unit 401 compares motion estimation reference pixels "MEpel" which is outputted by the multi-frame memory 402 and a picture signal "Vin", and outputs a motion vector "MV" and a reference picture number "RefNo". The reference picture number RefNo is an identification signal that identifies the reference picture, selected from among a plurality of reference pictures, to be referred to by the current picture to be coded. The motion vector MV is temporarily stored in the motion vector memory 408, after which it is outputted to the motion vector prediction unit 409, as an adjacent motion vector "PrevMV". The motion vector prediction unit 409 predicts a predictive motion vector "PredMV" by referring to the received adjacent motion vector PrevMV. The subtraction unit 404 subtracts the predictive motion vector PredMV from the motion vector MV, and outputs the difference as a motion vector prediction difference "DifMV".

At the same time, the multi-frame memory 402 outputs the pixels indicated by the reference picture number RefNo and the motion vector MV, as motion compensation reference pixels MCpel1. The motion compensation unit 405 generates and outputs sub-pixel precision reference pixels as reference image pixels "MCpel2". The subtraction unit 403 subtracts reference image pixels MCpel2 from the picture signal Vin, and outputs a prediction error "DifPel".

The coding unit 406 performs variable-length coding on the prediction error DifPel, the motion vector prediction difference DifMV, and the reference picture number RefNo, and outputs a coded stream "Str". In addition, a decoded prediction error "RecDifPel", which is the decoded result of the prediction error, is also outputted simultaneously at the time of coding. The decoded prediction error RecDifPel is the prediction error DifPel superimposed with the coding error, and it matches the inter-picture prediction error obtained through the decoding of the coded stream Str by the inter-picture prediction decoding apparatus.

The addition unit 407 adds the decoded prediction error RecDifPel to the reference image pixels MCpel 2, and stores this in the multi-frame memory 402 as a decoded picture "RecPel". However, in order to effectively use the capacity of the multi-frame memory 402, the region for a picture stored in the multi-frame memory 402 is freed when not required. Furthermore, coded picture RecPel that does not need to be stored in the multi-frame memory 402 is not stored in the multi-frame memory 402.

Moreover, coding is performed in units referred to as a 16×16 pixel macroblock. In the H.264 specification, the appropriate block for motion compensation is selected, on a per macroblock basis, from among seven motion compensation block (hereinafter, also referred to simply as sub-block) sizes, namely 4×4, 4×8, 8×4, 8×8, 8×16, 16×8, and 16×16, and used for coding. Here, a macroblock can be partitioned in two stages, first, partitioning in a macroblock partition (four in the 8×8 size, two in the 8×16 size, two in the 16×8 size, or the 16×16 size) size and, with respect to the 8×8 macroblock partition, a sub-macroblock partition (four in the 4×4 size, two in the 4×8 size, two in the 8×4 size, and the 8×8 size) size.

FIG. 2 is a block diagram showing the structure of a conventional inter-picture prediction decoding apparatus. Parts that are the same as those in the inter-picture prediction coding apparatus shown in FIG. 1 are assigned the same symbols and their descriptions omitted.

The conventional inter-picture prediction decoding apparatus shown in FIG. 2 is an apparatus which decodes the coded stream Str coded by the inter-picture prediction coding apparatus shown in FIG. 1, and outputs a decoded picture signal "Vout". It includes a multi-frame memory 402, a motion compensation unit 405, an addition unit 407, an addition unit 501, a motion vector memory 408, a motion vector prediction unit 409, and a decoding unit 502.

The decoding unit 502 decodes the coded stream Str, and outputs the decoded prediction error RecDifPel, the motion vector prediction difference DifMV, and the reference picture number RefNo. The addition unit 501 adds the predictive motion vector PredMV outputted by the motion vector prediction unit 409 and the motion vector prediction difference DifMV, and decodes the motion vector MV.

The multi-frame memory 402 outputs the pixels indicated by the reference picture number RefNo and the motion vector MV, as the motion compensation reference pixels MCpel1. The motion compensation unit 405 generates and outputs sub-pixel precision reference pixels as the reference image pixels MCpel2. The addition unit 407 adds the decoded prediction error RecDifPel to the reference image pixels MCpel2, and stores this in the multi-frame memory 402 as a decoded picture RecPel. However, in order to effectively use the capacity of the multi-frame memory 402, the region of a picture stored in the multi-frame memory 402 is freed when not required. Furthermore, coded picture RecPel that does not need to be stored in the multi-frame memory 402 is not stored in the multi-frame memory 402. In the manner described above, the decoded picture signal Vout, in other words the decoded picture RecPel can be properly decoded from the coded stream Str.

Incidentally, the H.264 specification permits the performance of motion compensation up to quarter-pixel units (up to half-pixel units in MPEG-4 Simple Profile). At this time, a 6-tap filter is applied as the method for linear filtering pixel interpolation, and the obtainment of a half-pixel precision pixel from surrounding 6 pixels is required in the H.264 specification. The pixel interpolation using the 6-tap filter shall be explained using FIG. 3.

FIG. 3 is a schematic diagram for describing the method for the interpolation of luminance component pixels in the H.264 specification.

Pixels F00, F01, F02, F03, F04, F05, F10, F11, F12, F13, F14, F15, F20, F21, F22, F23, F24, F25, F30, F31, F32, F33, F34, F35, F40, F41, F42, F43, F44, F45, F50, F51, F52, F53, F54, and F55 are pixels with an integer precision pixel location, and are shown as squares filled with slanted lines. Here, pixels A, B, C, D, E, F, G, H, I, J, K, L, M, N, O, P, Q, R, S, T, and U indicate the respective locations and pixel values.

Furthermore, pixels with a sub-pixel precision pixel location are shown as white squares. Pixels aa, bb, b, s, gg, and hh indicate intermediate calculated pixel values resulting from a 6 tap filtering in the horizontal direction and their locations. Pixels cc, dd, h, m, ee, and ff indicate intermediate calculated pixel values resulting from a 6 tap filtering in the vertical direction and their locations.

Pixels a, c, d, e, f, g, i, j, k, n, p, q, and r represent pixel values and locations resulting from the performance of a second 6tap filtering and linear interpolation in the respective sub-pixel precision pixel locations.

Accordingly, in order to obtain the value of the sub-pixel precision pixel locations surrounded by the pixels G, H, M, and N which are integer precision pixels, an area of 6×6 pixels is required.

Furthermore, in the block unit in which motion compensation is performed, as shown in FIG. 4, as 6 tap filtering is used for the luminance component in the H.264 specification with respect to area 901 on which the pixels of the block for motion compensation are located, the pixels in area 902 which is wider than the current block by 2 pixels above, 3 pixels below, 2 pixels to the right, and 3 pixels to the left, in other words, 5 pixels respectively for both the horizontal and vertical directions, are required. Accordingly, when sub-pixel precision motion compensation is carried out in each of the 4×4, 4×8, 8×4, 8×8, 8×16, 16×8, and 16×16 block sizes, a 9×9, 9×13, 13×9, 13×13, 13×21, and 21×21 pixel area, respectively, is required.

On the other hand, chrominance component is generated by linear interpolation from 4 integer precision pixels surrounding the sub-pixel precision pixel. The motion compensation block sizes in the case of the chrominance component are 2×2, 2×4, 4×2, 4×4, 4×8, 8×4, and 8×8, and their reference pixel areas are 3×3, 3×5, 5×3, 5×4, 5×9, 9×5, and 9×9, respectively (see "Draft ITU-T Recommendation and Final Standard of Joint Video Specification", Joint Video Team (JVT) of ISO/IEC MPEG & ITU-T VCEG, JVT-1050, September 2003, pp. 122-125, for example).

Incidentally, in decoding in the aforementioned manner, the decoded picture RecPel needs to be temporarily held in the multi-frame memory 402 up to the time of display as the reference pixels need to be read from the multi-frame memory 402, and in addition, there are instances where the picture sequence of inputted coded data and the reconstructed frame sequence are different. As a result of accessing such as the reading-out of pixels, storage of coded picture RecPel, and the display thereof, the percentage occupied by such accesses in the bus leading to the multi-frame memory 402 is, in general, extremely high.

As such, even when the multi-frame memory is utilized as a memory used for another function such an On Screen Display (OSD), for example, in order to reduce the memory capacity required for decoding, difficulties in allowing dual-purpose usage presents itself as a problem due to the high percentage of the bus being occupied.

With respect to such issue, a technique for reducing the number of accesses to the multi-frame memory 402 is proposed in the conventional picture decoding method. For example, Japanese Laid-Open Patent Application No. 10-215457 Publication describes the reduction of the number of accesses to the multi-frame memory 402 by determining the common area between the reference pixel area required by the current block to be performed of motion compensation and the reference pixel area required by an immediately preceding block, and updating only the pixels outside the determined common area.

However, in the H.264 specification and the like, having an increasing number of motion compensation prediction methods for improving compression efficiency, there are many cases in which almost no common area exists as motion compensation can be performed in extremely small areas, such as 4×4, 4×8 and 8×4 block units for the luminance component, and 2×2, 2×4, 4×2 block units, and so on, for the chrominance component.

FIGS. 5A and 5B are schematic diagrams showing an example of the pixel areas referenced by the current block to be decoded and the block to be decoded immediately before. FIG. 5A shows the appearance of an 8×8 block and FIG. 5B shows the appearance of a 2×2 block.

For example, in the 8×8 block size shown in FIG. 5A, area 913 represents the overlapping region of area 911 referred to by the current block to be decoded and area 912 referred to by the block to be decoded immediately before. This area 913 becomes a non-update area within the local reference memory of the motion compensation unit 405. Here, the difference of the absolute coordinates of area 911 and area 912 in terms of the reference picture is (4, 3). When the number of filter taps is 2 taps according to a bi-linear-type linear interpolation, and the like, the number of pixels in the non-update area is 30 (=5×6) as the overlap in the horizontal direction is 5 pixels and the overlap in the vertical direction is 6 pixels.

On the other hand, in FIG. 5B, the difference of the absolute coordinates, in terms of the reference picture, of area 914 referred to by the current block to be decoded in the 2×2 block size and area 915 referred to by the block to be decoded immediately before is (4, 3) as in the case in FIG. 5A. When the number of filter taps is 2, the situation arises in which there are no overlapping pixels for the non-update area.

Furthermore, depending on the width of the access bus of the multi-frame memory 402, there is a possibility that transmission of only the non-common area is not possible, with the common areas also being eventually transmitted, and the number of accesses cannot be reduced. FIG. 6 is an example showing a part of a decoded picture 921. As 4 pixels in the horizontal direction make up one access unit, in other words, as 1 pixel is made up of 1 byte, it is a diagram showing the case of a memory having a 4-byte bus width.

For example, as shown in FIG. 6, it is assumed that area 923, filled in with slanted lines, referred to by the block coded immediately before the current block to be decoded in the 2×2 block size, is located starting from the head of a 4-byte boundary, and the difference of the absolute coordinates between area 922, referred to by the current block to be decoded and enclosed in heavy lines is (1, 0). Out of 9 pixels, 6 pixels are in a common area, and normally only the 3 pixels of the dotted area 924 need to be updated. However, as a memory structure having a 4-byte bus width is being considered, a 4-byte by 3-line memory transmission which includes area 923 is required for the transmission of area 922, which in effect, means that all the pixels are transmitted.

In addition, in the 8×8, 8×16, 16×8 and 16×16 block sizes for luminance and the 4×4, 4×8, 8×4 and 8×8 block sizes for chrominance (hereinafter referred to as "macroblock partition type", for short), the non-existence of a common area is anticipated from the start, even for adjacent sub-blocks inside the same macroblock for example, as motion compensation using a different reference picture is possible. However, in the 4×4, 4×8, 8×4, and 8×8 block sizes for luminance and the 2×2, 2×4, 4×2 and 4×4 block sizes for chrominance (hereinafter referred to as "sub-macroblock partition type", for short), the same reference picture is used for sub-blocks within the same macroblock partition.

In other words, the number of reference pictures and the types of block shapes that can be selected in motion compensation is being increased in order to improve compression efficiency. Furthermore, in the H.264 specification, and the like, which uses high-level tap filter interpolation, there is a high possibility that the number of accesses to the multi-frame memory 402 cannot be reduced by limiting the update area of the reference memory using the determination of a common area in the conventional technology.

SUMMARY OF THE INVENTION

The present invention is conceived in view of such problems and has as an objective to provide a motion compensation apparatus that can reduce the number of pixels for reading out pixel data from the multi-frame memory, and realize the reduction of transmission and motion compensation for sub-pixel precision pixel generation, for efficient motion compensation pixel generation.

In order to achieve the aforementioned objective, the motion compensation apparatus according to the present invention is a motion compensation apparatus that performs motion compensation, in block units, between pictures making up a moving picture, the apparatus includes a picture memory which stores a reference picture, a local memory which stores reference pixel data of the reference picture, transmitted from the picture memory, an area identification unit which identifies a transmission area including a reference area required in motion compensation of blocks, a reference pixel transmission unit which transmits, from the picture memory to the local memory, reference pixel data of the transmission area identified by the area identification unit, and a motion compensation unit which performs motion compensation using the reference pixel data stored in the local memory.

Accordingly, in the case where it is more efficient to transmit reference pixel data required for a block, all at once for several blocks when performing inter-picture motion compensation prediction, reduction of the percentage of the bus which is occupied and reduction of the processing cycle can be realized through the reduction of the number of accesses to the picture memory, as the need for redundantly transmitting on a per block-processing basis, reference areas that overlap among the blocks is eliminated by the transmission of reference data all at once.

Furthermore, the area identification unit may identify at least one rectangular area as the transmission area. Accordingly, transmission area address generation becomes relatively easy, and the mounting area of the area identification unit and the reference pixel transmission unit can be reduced.

Furthermore, the local memory stores only the reference pixel data of the reference area included in the transmission area transmitted from the picture memory. Accordingly, by not storing unnecessary pixel data in the local memory, the capacity of the local memory can be reduced and at the same time, unnecessary write-in processes can be reduced.

Furthermore, the reference pixel transmission unit may actually transmit only a unit of transmission between the picture memory and the local memory, which includes the reference area within the transmission area. Accordingly, as unnecessary memory access to the picture memory is also reduced, reduction of the percentage of the bus which is occupied and reduction of the processing cycle can be realized.

Furthermore, the motion compensation unit may further perform a filtering process for generating sub-pixel precision pixel data, using the reference pixel data stored in the local memory. Here, the motion compensation unit may perform the filtering process of the reference pixel data stored in the local memory, all at once, for each of the transmission areas. Accordingly, in the case where filtering is performed all at once for filtering processes that are redundantly performed on the same pixel locations when sub-pixel precision pixel data is generated on a per block basis, reduction of processing volume becomes possible as such processes are accomplished in a single process.

Furthermore, the motion compensation unit may perform the filtering process, with respect to the reference pixel data stored in the local memory, only for areas of any of the blocks, which require sub-pixel precision motion compensation. Accordingly, aside from accomplishing the redundantly executed filtering processes in a single processing, in the generation of sub-pixel precision pixel data, by determining the unnecessary filtering areas and not processing aggressively, further reduction of processing volume becomes possible.

Furthermore, the motion compensation apparatus may further include a first filtering unit which performs part of the filtering process for generating sub-pixel precision pixel data, the first filtering unit being placed between the picture memory and the local memory, wherein the motion compensation unit may perform the rest of the filtering process, which is not performed by the first filtering unit. Accordingly, as a part or, depending on the sub-pixel precision motion compensation locations, all of the filtering processes can be performed simultaneously during reading from the local memory, process cycle reduction becomes possible.

In addition, the present invention is not limited to being implemented as a motion compensation apparatus described herein. The present invention can also be implemented as a motion compensation method which includes, as steps, the characteristic units included in the motion compensation apparatus described herein, and as a program that causes a computer to execute such steps. Furthermore, it goes without saying that such program can be distributed via a recording medium such as a CD-ROM, a transmission medium such as the Internet, and so on.

As is clear from the abovementioned explanation, according to the motion compensation apparatus in the present invention, in the case where it is more efficient to transmit reference pixel data required for a block, all at once for several blocks when performing inter-picture motion compensation prediction, reduction of the percentage of the bus which is occupied and reduction of the processing cycle can be realized through the reduction of the number of accesses to the picture memory, as the need for redundantly transmitting on a per block-processing basis, reference areas that overlap among the blocks is eliminated by the transmission of reference data all at once.

FURTHER INFORMATION ABOUT TECHNICAL BACKGROUND TO THIS APPLICATION

The disclosure of Japanese Patent Application No. 2004-145585 filed on May 14, 2004 including specification, drawings and claims is incorporated herein by reference in its entirety.

BRIEF DESCRIPTION OF THE DRAWINGS

These and other objects, advantages and features of the invention will become apparent from the following description thereof taken in conjunction with the accompanying drawings that illustrate a specific embodiment of the invention.

In the Drawings:

FIG. 12A is a diagram showing a random-shaped sum area of sub-blocks to be transmitted.

FIG. 12B is a diagram showing a single-rectangular sum area of sub-blocks to be transmitted.

FIG. 13 is a flowchart showing the process flow for deriving a random-shaped sum area of sub-blocks to be transmitted.

FIG. 14 is a flowchart showing the process flow for deriving a single-rectangular sum area of sub-blocks to be transmitted.

FIG. 21 is a flowchart for deriving the vertical filtering and horizontal filtering valid pixel area.

DETAILED DESCRIPTION OF THE INVENTION

Hereinafter, the embodiments of the present invention shall be explained with reference to the diagrams.

First Embodiment

Figure 1:
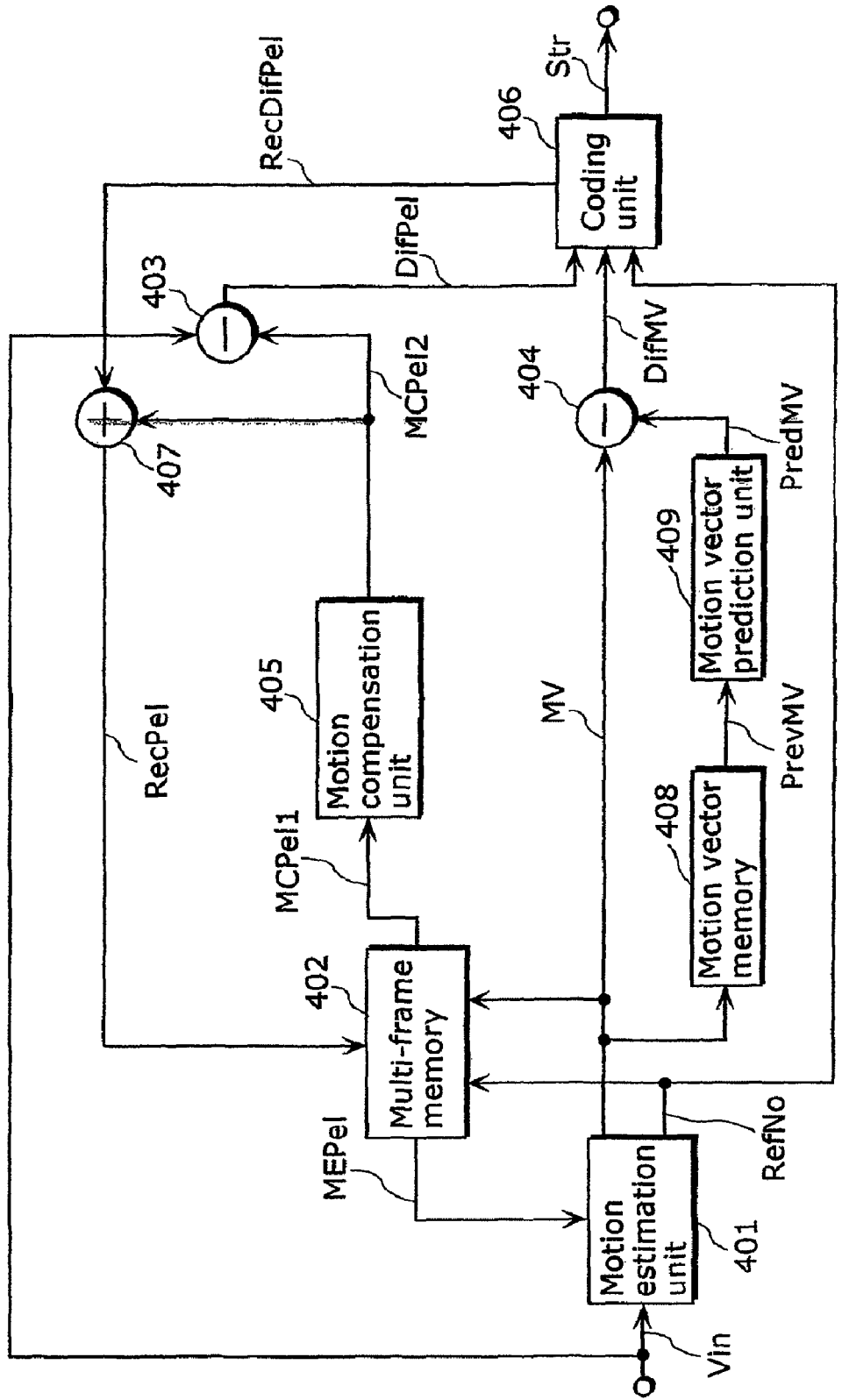
FIG. 1 is a block diagram showing the structure of the conventional inter-picture prediction coding apparatus.
Figure 2:
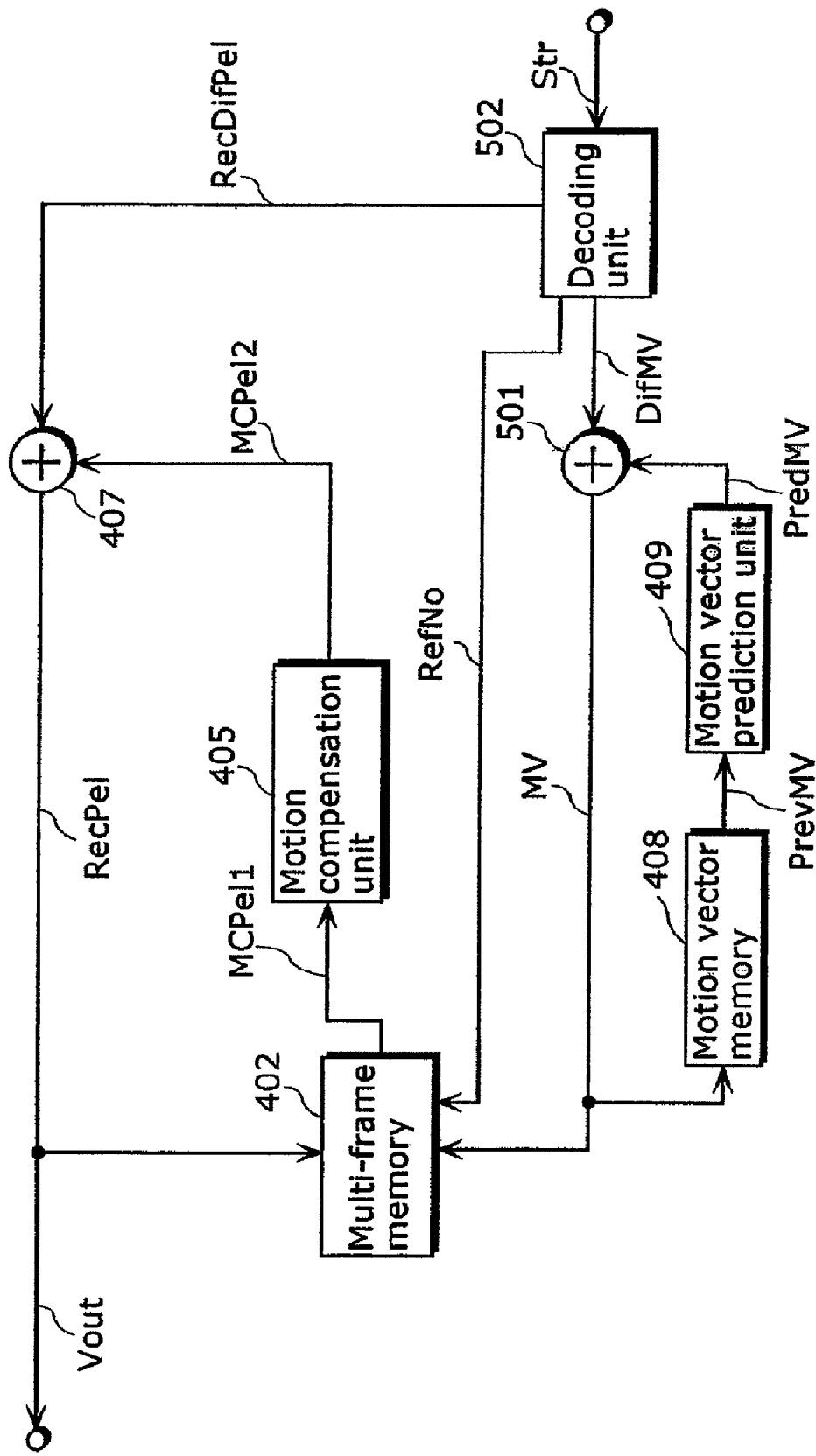
FIG. 2 is a block diagram showing the structure of the conventional inter-picture prediction decoding apparatus.
Figure 3:
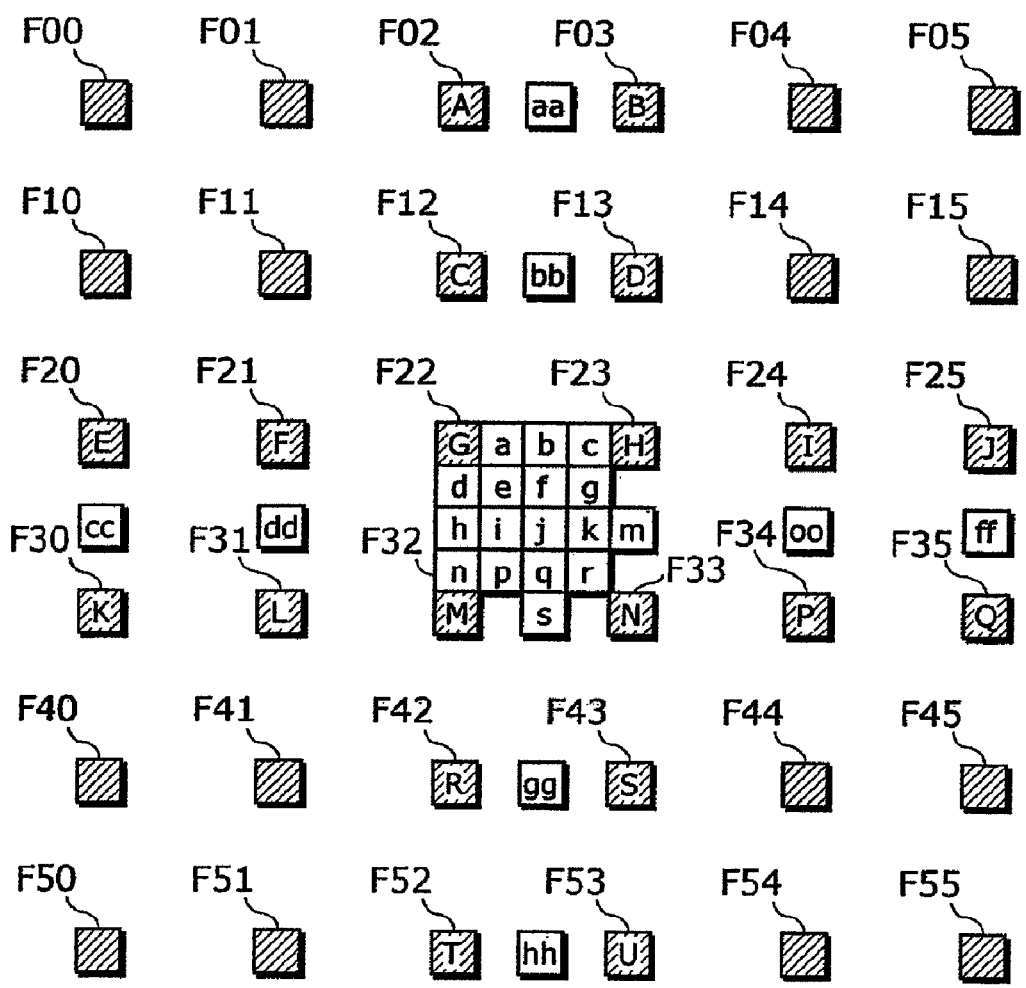
FIG. 3 is a diagram showing the alignment of integer precision pixels for 6-tap filtering.
Figure 4:
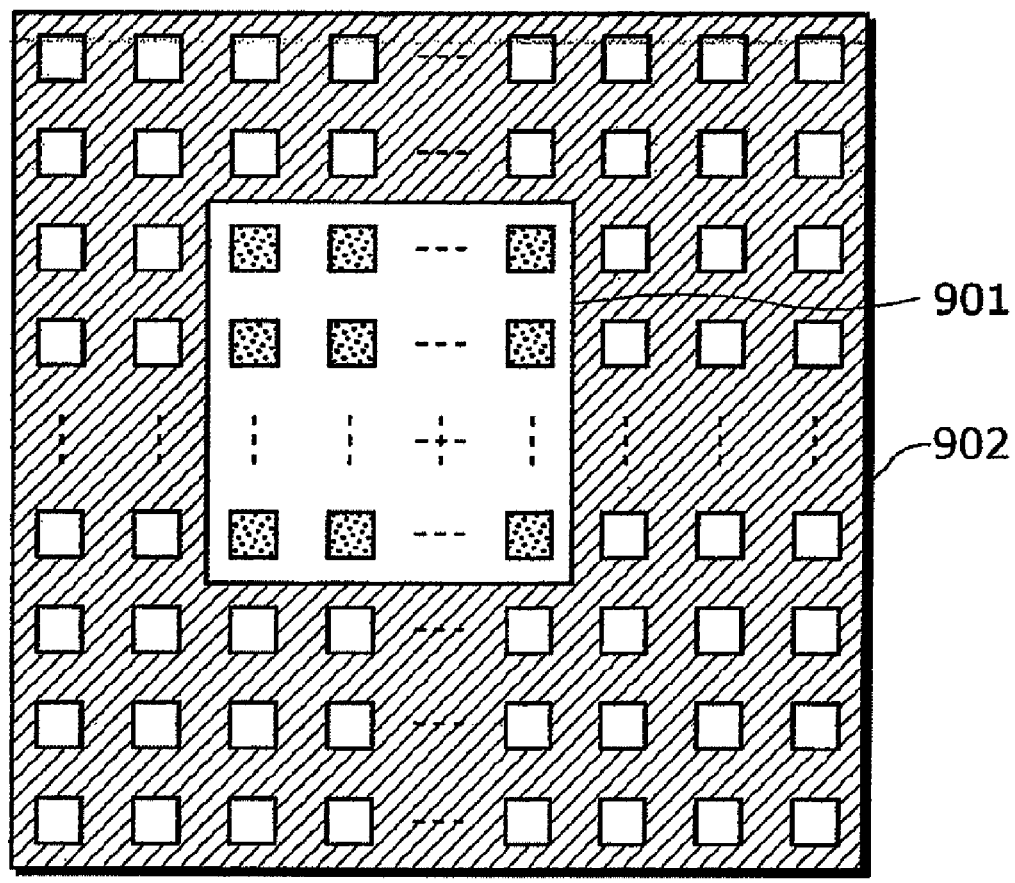
FIG. 4 is a diagram showing a reference pixel area for 6-tap filtering.
Figure 5A:
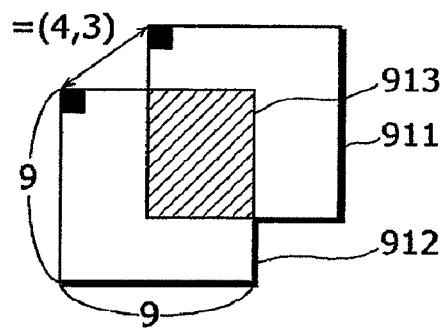
FIG. 5A is a diagram showing the overlapping of the reference pixel area of a current block and the reference pixel area of a block immediately preceding it.
Figure 5B:
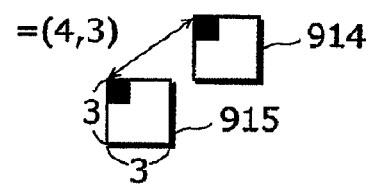
FIG. 5B is a diagram showing the condition in which there is no overlapping of the reference pixel area of the current block and the reference pixel area of a block immediately preceding it.
Figure 6:
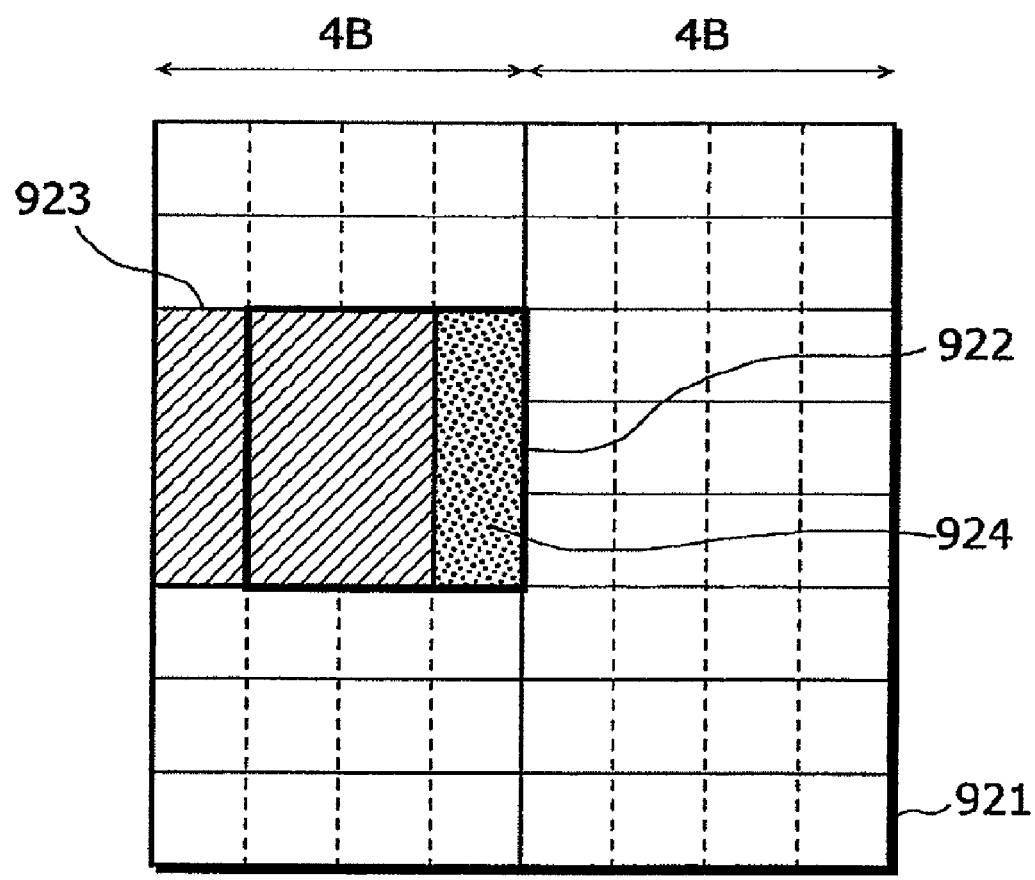
FIG. 6 is a diagram showing the condition in which both the reference pixel area of a current block and the reference pixel area of a block immediately preceding it are included within the borders of a unit of transmission.
Figure 7:
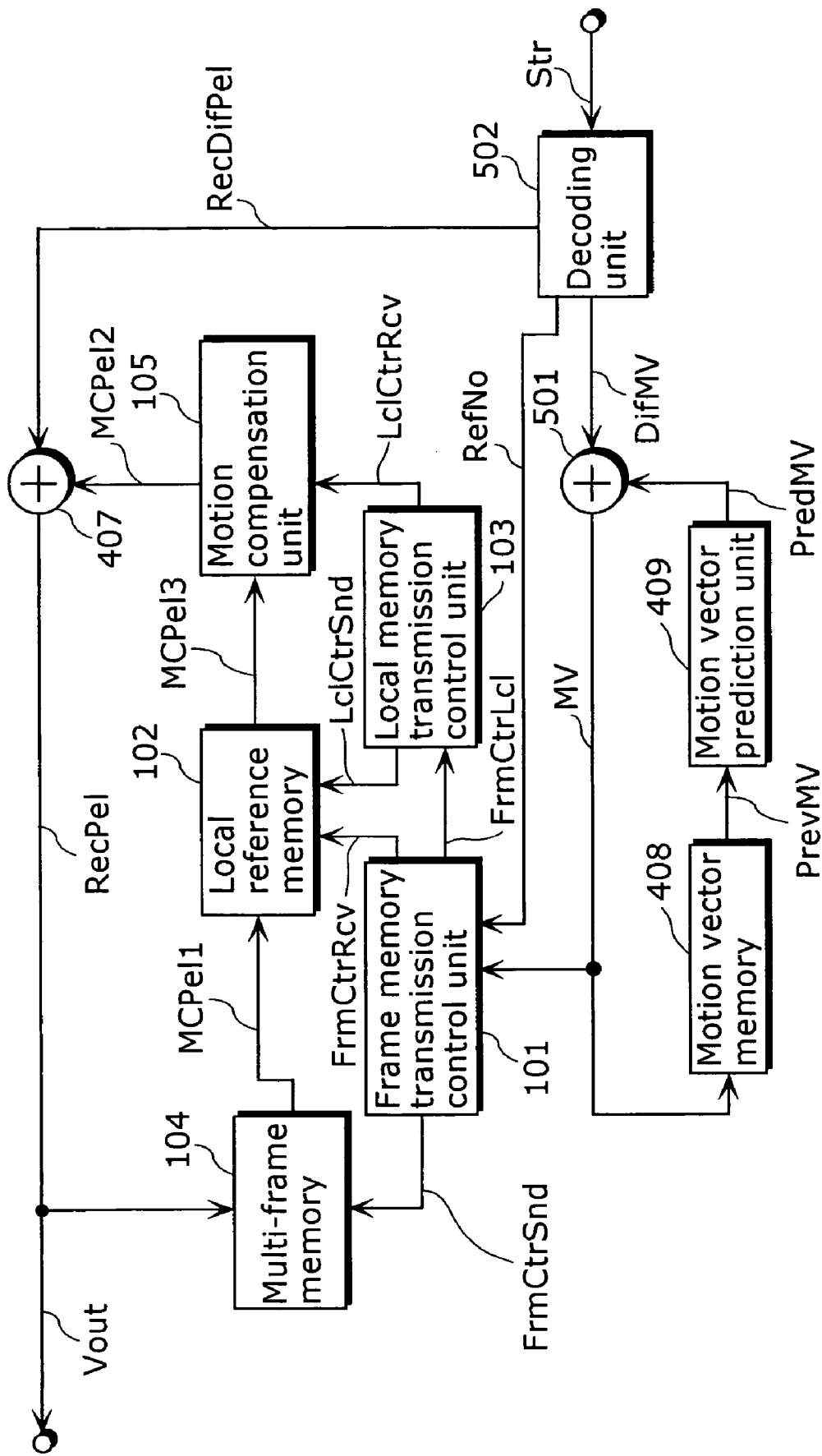
FIG. 7 is a block diagram showing the structure of the inter-picture prediction decoding apparatus using the motion compensation apparatus in the first embodiment of the present invention.

FIG. 7 is a block diagram showing the structure of the inter-picture prediction decoding apparatus using the motion compensation apparatus in the first embodiment of the present invention. Furthermore, parts that are the same as those in the conventional inter-picture prediction decoding apparatus shown in FIG. 2 are assigned the same symbols and their descriptions are omitted.

As shown in FIG. 7, the inter-picture prediction decoding apparatus according to the first embodiment of the present invention includes a frame memory transmission control unit 101, a local reference memory 102, a local memory transmission control unit 103, a multi-frame memory 104, a motion compensation unit 105, an addition unit 407, an addition unit 501, a motion vector memory 408, a motion vector prediction unit 409, and a decoding unit 502.

The multi-frame memory (picture memory) 104, stores a decoded picture RecPel outputted by the addition unit 407. The motion compensation unit 105 generates sub-pixel precision reference pixels, and outputs such reference pixels as reference image pixels MCpel2.

The local reference memory 102 is a memory located between the multi-frame memory 104 and the motion compensation unit 105, which only the motion compensation unit 105 refers to, and into which a motion compensation reference pixels MCpel1 is inputted from the multi-frame memory 104. Pixels "MCpel3" is outputted from the local reference memory 102 and inputted to the motion compensation unit 105.

The frame memory transmission control unit 101 identifies the reference pixels required for motion compensation, based on a reference picture number RefNo and a motion vector MV, and is a control circuit (making up an area identification unit and a reference pixel transmission unit) that controls the reading of pixels from the multi-frame memory 104. The frame memory transmission control unit 101 controls the transmission by the multi-frame memory 104 using a control signal "FrmCtrSnd", controls the reception by the local reference memory 102 using a control signal "FrmCtrRcv", and in addition, controls the local memory transmission control unit 103 which controls the operation of the local reference memory 102 and the motion compensation unit 105 using a control signal "FrmCtrlLcl".

According to the received control signal FrmCtrLcl, the local memory transmission control unit 103 judges the condition in which pixels are transmitted from the multi-frame memory 104 to the local reference memory 102, controls the transmission of the local reference memory 102 using a control signal "LclCtrSnd" and controls reception using a control signal "LclCtrRcv".

Hereinafter, the detailed operation of the inter-picture prediction decoding apparatus in the first embodiment shall be explained. Operations, aside from those of pixel transmission from the multi-frame memory 104 to the motion compensation unit 105 and motion compensation predictive picture generation, are the same as those in the decoding process in the conventional structure. The difference with the decoding operations in the conventional structure lies in the operation in which the motion compensation reference pixels MCpel1 is read from the multi-frame memory 104 and stored in the local reference memory 102 by switching between an all-at-once transmission or transmission in parts, for the transmission area of the integer precision pixel data, depending on conditions such as the size and location of the sub-block unit to be performed of motion compensation. In addition, there is also the operation in which, depending on conditions, such as the sub-pixel precision motion compensation locations required for the current sub-block, and the transmission area unit sent all at once or individually, (i) the filtering for sub-pixel precision motion compensation is switched between an all-at-once performance or performance in parts, and the integer precision motion compensation reference pixels MCpel1 stored in the local reference memory 102 is read as the motion compensation reference pixel MCpel3, and (ii) this is filtered by the motion compensation unit 105 and outputted as the reference image pixels MCpel2.

Here, the process control operation shall be explained with the H.264 specification as an example. In the H.264 specification, motion compensation can be performed in a block that is smaller than a 16 pixel×16 pixel macroblock. In other words, aside from the 16×16 macroblock size, motion compensation prediction is possible for the luminance component, in 16×8, 8×16, 8×8, 8×4, 4×8, and 4×4 sub-block units, as described in the aforementioned background art. At the same time, with the chrominance component, motion compensation prediction is possible in 8×8, 8×4, 4×8, 4×4, 4×2, 2×4, and 2×2 block units. However, as overall, these are macroblocks and sub-blocks which are half the height and width of those for the luminance component, explanations from here on shall be centered on the luminance component.

Furthermore, a plurality of sub-macroblock partitions belonging to the same 8×8 macroblock partition necessarily use the same reference picture as a reference image. However, as a different picture can be used as a reference image, by each macroblock partition even in the same macroblock, explanation shall be continued for now, under the assumption that a sub-block is an 8×4, 4×8, and 4×4 sub-macroblock partition.

Figure 8:
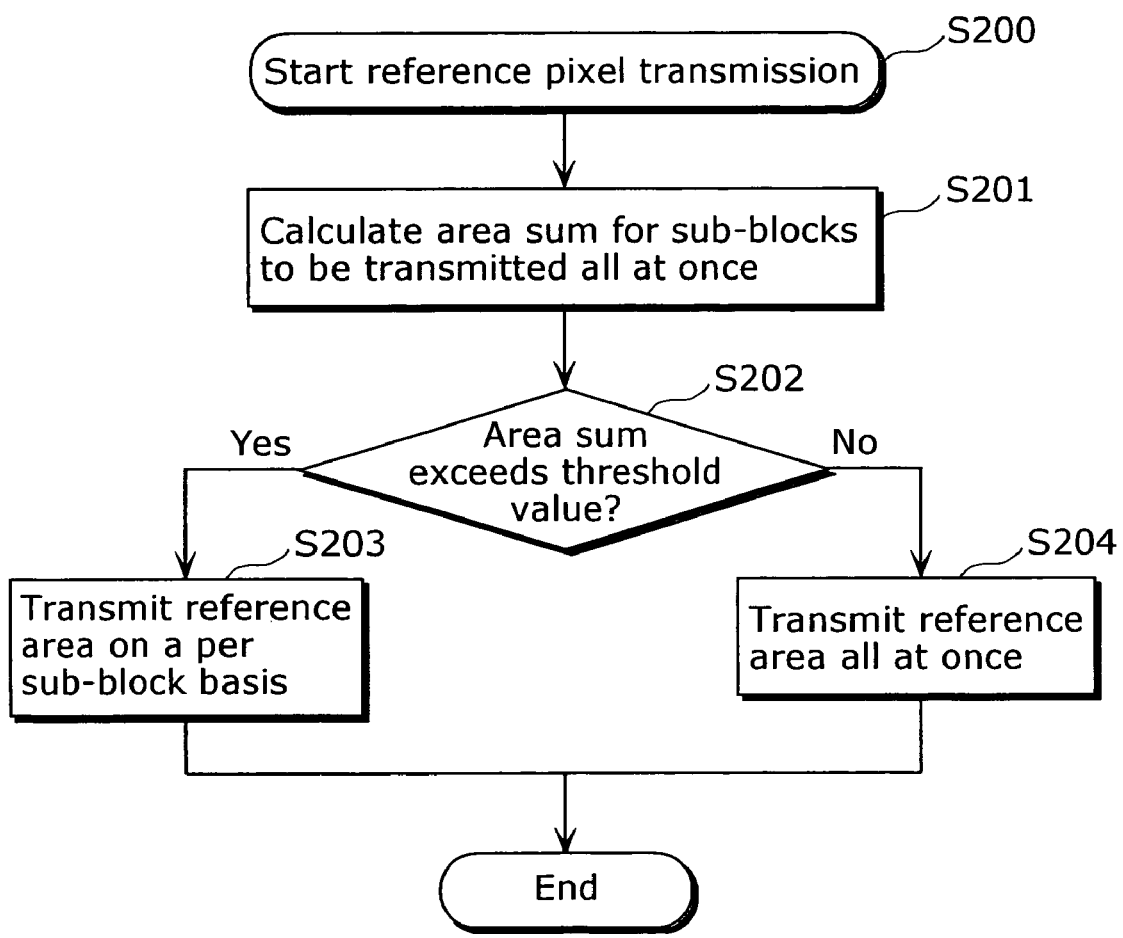
FIG. 8 is a flowchart showing the flow of controlling performed by the frame memory transmission control unit.

First, a detailed description of the operation of the frame memory transmission control unit 101 shall be made using FIG. 8 to FIG. 17. FIG. 8 is a flowchart showing an outline flow of control performed by the frame memory transmission control unit 101.

Step S200 indicates the start of the transmission of the motion compensation reference pixels MCpel1, which is performed for each macroblock partition.

First, the frame memory transmission control unit 101 calculates the sum of the areas of the sub-blocks that are candidates for collective transmission (S201).

The frame memory transmission control unit 101 determines whether or not the area sum obtained in step S201 exceeds a threshold value for stipulating whether it is more advantageous to perform transmission all at once or on a per sub-block basis (step S202).

In the case where it is determined in step S202 that the threshold value is exceeded (Yes in step S202), the reference area is transmitted on a per sub-block basis (step S203).

In the case where it is determined in step S202 that the threshold value is not exceeded (No in step S202), the reference area is transmitted all at once (step S204).

Step S205 indicates the end of the transmission of the motion compensation reference pixels MCpel1.

In the sequence described above, transmission is controlled by determining whether transmission of sub-blocks should be performed all at once or on a per sub-block basis. Hereinafter, explanation shall be made regarding the details of the method for deriving the sum area for the sub-blocks in step S201 and the method for deriving the threshold value in step S202. In preparation, details of the reference pixel area calculation for sub-blocks shall be described, after which the method for deriving the sum area and the method for deriving the threshold value shall each be explained.

Figure 9A:
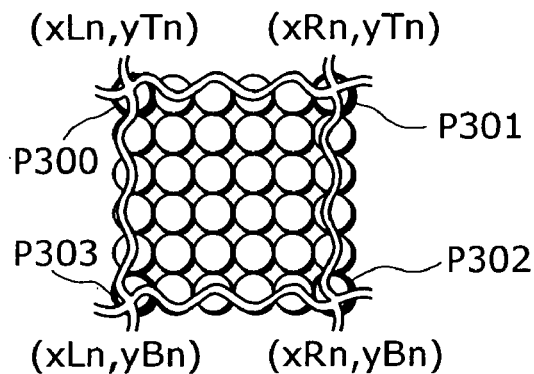
FIG. 9A is a diagram showing the pixels in a reference pixel area.
Figure 9B:
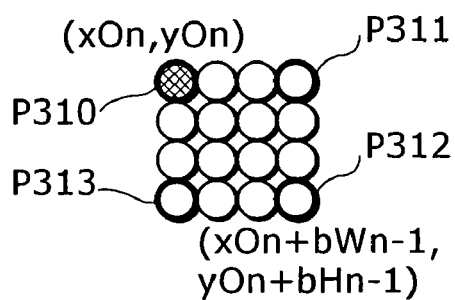
FIG. 9B is a diagram showing the pixels in a reference pixel area in the case where horizontal and vertical filtering are not required.
Figure 9C:
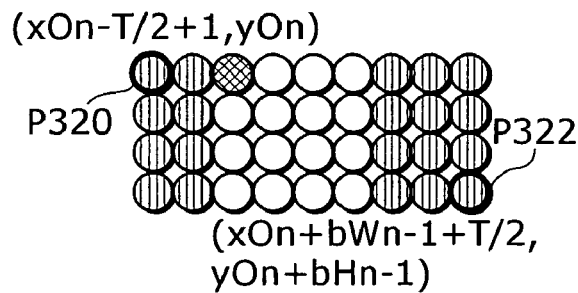
FIG. 9C is a diagram showing the pixels in a reference pixel area in the case where horizontal filtering is required.
Figure 9D:
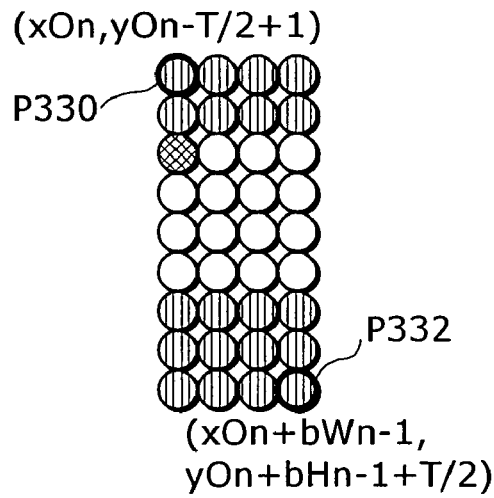
FIG. 9D is a diagram showing the pixels in a reference pixel area in the case where vertical filtering is required.
Figure 9E:
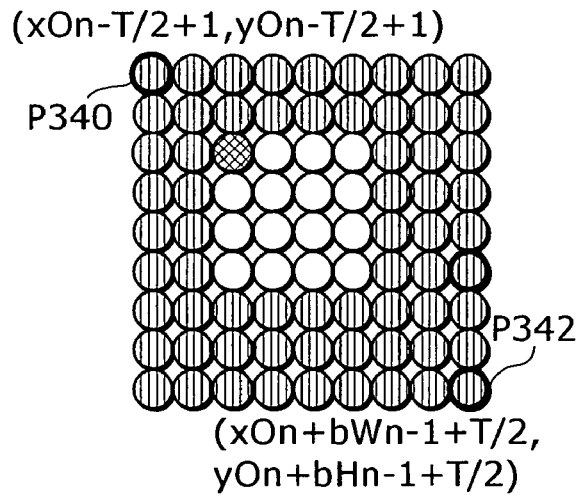
FIG. 9E is a diagram showing the pixels in a reference pixel area in the case where both horizontal and vertical filtering are required.
Figure 10:
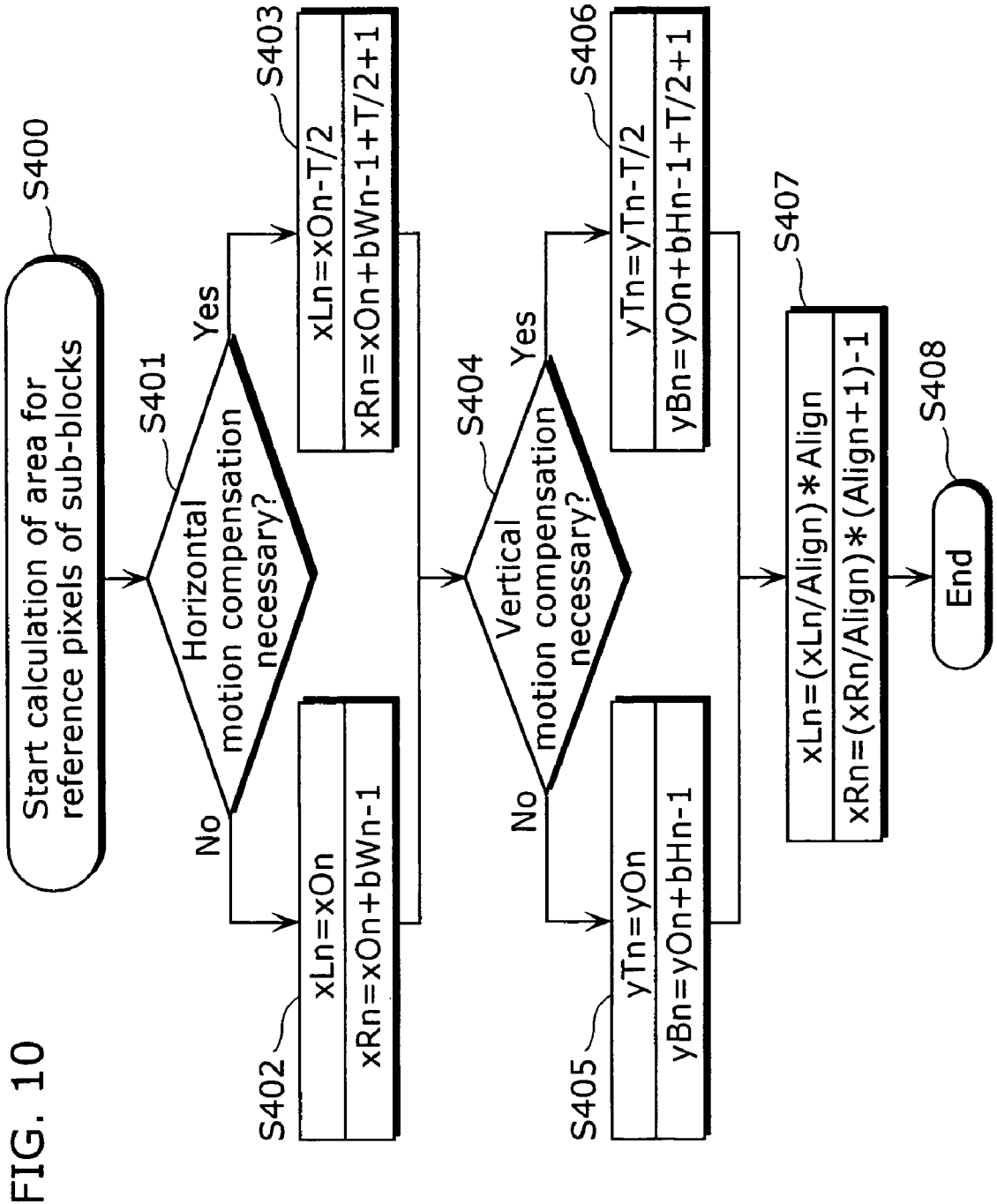
FIG. 10 is a flowchart showing the process flow for obtaining the coordinates of pixels in the reference pixel area.

A detailed explanation of the operation regarding the calculation for the area of the reference pixels of a sub-block shall be made using FIG. 9 and FIG. 10.

FIGS. 9A to 9E are pattern diagrams showing the sub-block area on the reference picture and the reference image area including the pixels around the sub-block. FIG. 9A represents the area required as a reference image, and is a pattern diagram representative of FIGS. 9B to 9E. FIG. 9B represents the area which is referred to in the case where sub-pixel precision motion compensation is not required. This reference area has an area size that is the same as the size of the sub-block. FIG. 9C shows the reference area in the case where only sub-pixel precision motion compensation in the horizontal direction is required. FIG. 9D shows the reference area in the case where only sub-pixel precision motion compensation in the vertical direction is required. In addition, FIG. 9E shows the reference area in the case where sub-pixel precision motion compensation in both the horizontal and vertical directions are required.

Each of the circles in FIGS. 9A to 9E represent a reference pixel. Among these, pixels P300, P301, P302, P303, P310, P3111, P3112, P3113, P320, P322, P330, P332, P340 and P342 shown as circles in heavy print, represent pixels located at the corners of the reference areas.

Pixel P300, P301, P302 and P303 are the four corners of the reference pixel area shown in FIG. 9A, and their coordinates are assumed as (xLn, yTn), (xRn, yTn), (xRn, yBn) and (xLn, YBn), respectively.

Furthermore, pixels P310, P3111, P3112 and P3113 are the four corners of the reference pixel area shown in FIG. 9B, and shows that the location of each of the pixels, in the case where the location of the top-left pixel is (xOn, yOn), the number of horizontal pixels in the sub-block is bWn−1, and the number of vertical pixels is bHn−1, is (xOn, yOn), (xOn+bWn−1, yOn), (xOn, yOn+bHn−1) and (xOn+bWn−1, yOn+bHn−1), respectively.

In addition, pixels P320 and P322 represent the two opposing corners on the top-left and bottom-right of the reference pixel area shown in FIG. 9C, pixels P330 and P332 represent the two opposing corners on the top-left and bottom-right of the reference pixel area shown in FIG. 9D, and pixels P340 and P342 represent the two opposing corners on the top-left and bottom-right of the reference pixel area shown in FIG. 9E, respectively.

FIG. 10 shows a flowchart for calculating the pixel area required by each sub-block, as a reference image. Following the process indicated in the flowchart in FIG. 10, the location of the four corners of the reference pixels shown in FIG. 9A is obtained, and fixed as any of the areas in FIG. 9B, 9C, 9D or 9E. Here, the number of filter taps for sub-pixel precision pixel generation is assumed as "T", and the unit of transmission in the transmission from the multi-frame memory 104, which is limited by the bus width and so on, is assumed as "Align".

Step 400 indicates the start of the calculation for the reference pixel area for a sub-block.

First, it is determined whether or not sub-pixel precision motion compensation in the horizontal direction is necessary for the current sub-block to be processed (step S401).

In the case where it is determined in step S401 that sub-pixel precision motion compensation in the horizontal direction is not necessary (No in step S401), it is assumed that xLn=xOn and xRn=xOn+bWn−1 (step S402). Here, sub-pixel precision motion compensation in the horizontal direction becomes unnecessary in the case where the motion compensation location in the horizontal direction indicated by the motion vector MV is an integer precision pixel location.

In the case where it is determined in step S401 that sub-pixel precision motion compensation in the horizontal direction is necessary (Yes in step S401), it is assumed that xLn=xOn−T/2+1 and xRn=xOn+bWn−1+T/2 (step S403).

After the process in step S402 or step S403, it is determined whether or not sub-pixel precision motion compensation in the vertical direction is necessary for the current sub-block (step S404).

In the case where it is determined in step S404 that sub-pixel precision motion compensation in the vertical direction is not necessary (No in step S404), it is assumed that yTn=yOn and yBn=yOn+bHn−1 (step S405). Here, sub-pixel precision motion compensation in the vertical direction becomes unnecessary in the case where the motion compensation location in the vertical direction indicated by the motion vector MV is an integer precision pixel location.

In the case where it is determined in step S404 that sub-pixel precision motion compensation in the vertical direction is necessary (Yes in step S404), it is assumed that yTn=yTn−T/2+1 and yBn=yOn+bHn−1+T/2 (step S406).

After the process in step S405 or step S406, in the case where there is a limitation on the number of pixels in a unit of transmission, in the transmission from the multi-frame memory 104, it is further assumed that, xLn=(xLn/Align) *Align and xRn=(xRn/Align) *(Align+1)−1 (step S407).

Step S408 indicates the end of calculation for the area of the reference pixels for the sub-block.

Through the performance of the process shown in the flowchart in FIG. 10, the pixel area required for the transmission of the reference pixels is obtained. Furthermore, in the case where there is no such limitation on the unit of transmission, in the transmission from the multi-frame memory 104, the process in step S407 is not necessary. Here, in the case where a process taking step S402 and S405 is performed, the pixel area required for the transmission of the reference pixels is the area shown in FIG. 9B. Likewise, the pixel area is that in FIG. 9C in the case where step S403 and step S405 are taken, that in FIG. 9D in the case of step S402 and step S406, and that in FIG. 9E in the case of step S403 and S406, and the reference pixel area is fixed.

However, although there is a possibility that unnecessary reference pixels may be included, for the sake of process simplification, it is also possible to use the area in FIG. 9E which is simply the largest reference area, instead of the derivation according to the flowchart shown in FIG. 10.

Next, the process for calculating a sum area which puts together reference pixels of a plurality of sub-blocks shall be explained in detail using FIG. 11 to FIG. 17.

Figure 11:
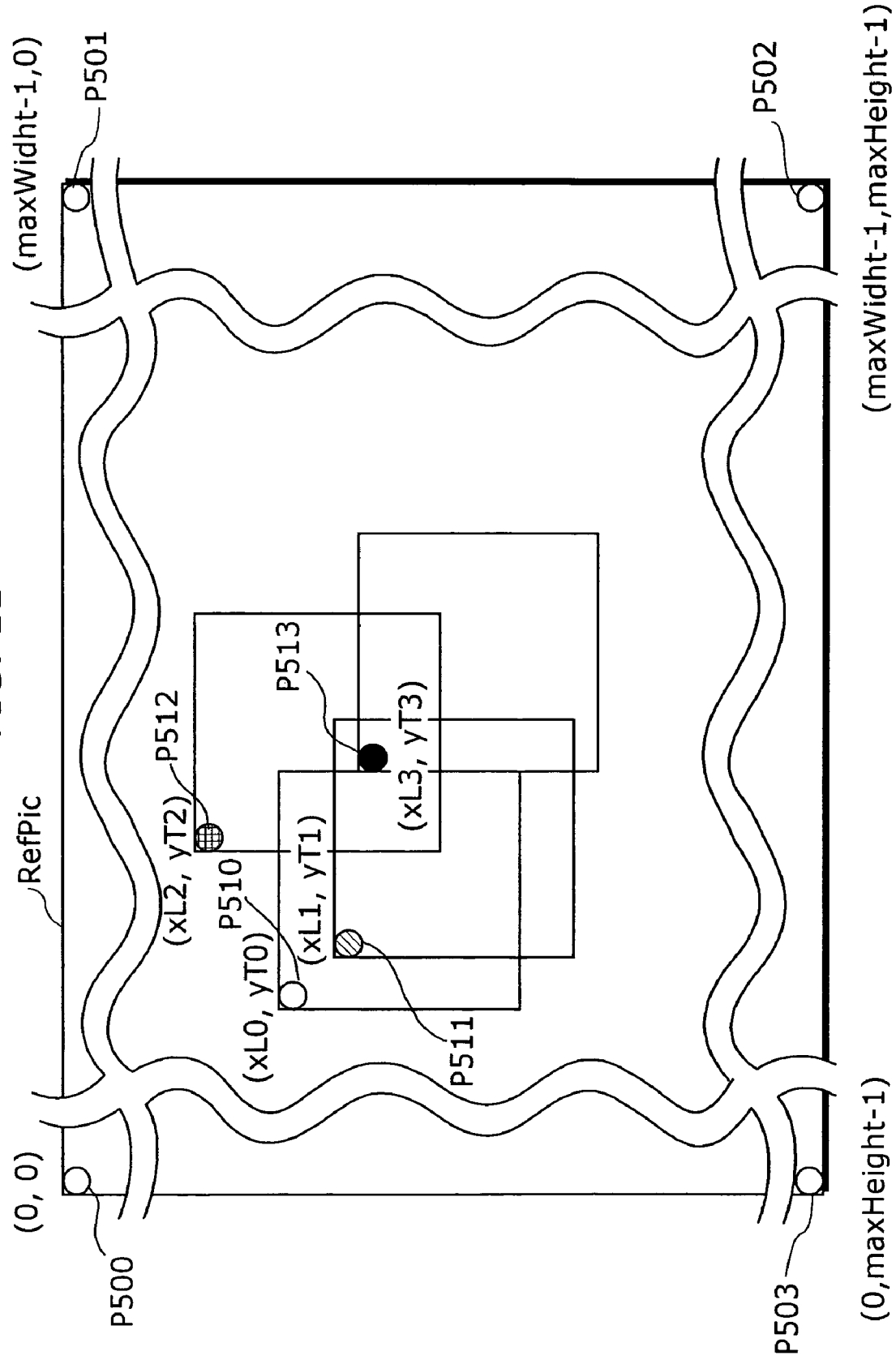
FIG. 11 is a diagram showing a reference picture and reference areas.

FIG. 11 is a pattern diagram showing an example of the case where the reference areas of four sub-blocks exist on a reference picture.

In FIG. 11, pixels P500, P501, P502 and P503 represent the four corners of a reference picture RefPic, and when the number of vertical and horizontal pixels of the picture is assumed as maxwidth and maxHeight, they indicate pixel locations (0,0), (maxWidth−1, 0), (maxWidth−1, maxHeight−1) and (0, maxHeight−1), respectively. Furthermore, pixels P510, P511, P512 and P513 each represent the top-left pixel locations of the reference pixel areas of the four sub-blocks, and it is assumed that the coordinates for each is (xL0, yL0), (xL1, yL1), (xL2, yL2) and (xL3, yL3), respectively.

Furthermore, from here on, when (xO0, yO0), (xO1, yO1), (xO2, yO2) and (xO3, yO3) are assumed as the top-left pixel locations of areas in the respective reference pixel areas, which are not accompanied by surrounding pixels required in filtering and having the same size as the sub-blocks (not shown in the diagrams due to complexity), the differential locations from (xO0, yO0) to (xO1, yO1), (xO2, yO2) and (xO3, yO3) are assumed to be (+2, +2), (+6, −3) and (+9, +3).

FIGS. 12A and 12B are pattern diagrams showing a sum areas made up of the reference pixels of the four sub-blocks having the top-left pixels P510, P511, P512 and P513 shown in FIG. 11. FIG. 12A shows the sum area in the case where a randomly shaped pixel area is transmitted, and FIG. 12B shows a rectangular section including all reference areas being assumed as the sum area. Here, heavy border lines B6a and B6b indicate the boundary of the sum area. The pixels within the heavy border lines B6a and B6b are transmitted from the multi-frame memory 104 to the local reference memory 102, as the motion compensation reference pixels MCpel1. In FIG. 12B, pixels P600 and P602, shown as white circles, respectively represent the top-left and bottom-right pixel locations in the rectangular area, and assume the coordinates (xMin, yMin) and (xMax, yMax), respectively. Furthermore, in the examples in FIGS. 12A and 12B, each sub-block assumes the form of a 4×4 sub-macroblock partition. Here, the reference pixel area of each sub-block uses the area in FIG. 9E which gives the largest area, and the case where there is no limitation in the unit of transmission, in the transmission from the multi-frame memory 104 is assumed. Furthermore, the sum area in the case of transmitting the randomly shaped pixel area, shown in FIG. 12A, can also be represented as the combination of a plurality of rectangular areas.

Although there are several methods for deriving the sum area, here, explanation shall be continued, citing two techniques which obtain the areas in 12A and 12B, namely the method using marking and the method using single-rectangle coordinate derivation, as examples.

First, sum area derivation by transmission area marking shall be explained.

FIG. 13 shows a flowchart for sum area derivation by transmission area marking. When this technique is used, a randomly shaped sum area can be obtained. Step S700 indicates the start of sum area derivation by marking.

First, initialization of each pixel location in the transmission map representing the transmission area is performed (step S701).

The first of sub-blocks which are transmission candidates is set for marking (step S702).

In the transmission map, a flag is raised at the pixel locations where the current sub-block to be processed exists (step S703).

It is determined whether or not processing has been performed on the sub-blocks which are candidates for transmission all at once, in other words, all the sub-macroblock partitions included in one macroblock partition (step S704).

In the case where it is determined in step S704 that processing has not been performed for all the sub-blocks (No in step S704), the next sub-block to be processed is set (step S705), and the sequence returns to the process in step S703.

In the case where it is determined in step S704 that processing has been performed for all the sub-blocks (Yes in step S704), an alignment process to respond to limitations in the unit of transmission from the multi-frame memory, is performed if necessary, as a final process (step S706). Furthermore, step S706 is an unnecessary process in the case where the reference areas of each sub-block are areas that already take into consideration the limitations in the unit of transmission.

Step S707 indicates the end of sum area derivation by marking. As a result of processing according to the flowchart shown in FIG. 13, the marking area including the circles in FIG. 12A, indicated by the heavy border line B6a is arrived at, and can be derived as the transmission area.

Subsequently, sum area derivation by single-rectangle coordinate derivation shall be explained.

FIG. 14 shows a flowchart for sum area derivation by single-rectangle coordinate derivation. When this technique is used, a sum area in which the transmission areas of a plurality of reference pixels are contained in a single rectangular area can be obtained. Step S800 indicates the start of sum area derivation by single-rectangle coordinate derivation.

First, initialization of the pixel locations of the pixels in the opposing corners indicating the transmission area (xMin=maxWidth, xMax=0, yMin=maxHeight, yMax=0) is performed (step S801). Here, maxwidth is assumed to be the largest value for the width of the picture size, and maxHeight is the largest value for the height of the picture size.

The first of the candidate sub-blocks is set for processing (step S802).

It is determined whether or not the left-most horizontal pixel location for the current sub-block to be processed has smaller coordinates than the left-most horizontal pixel location of the rectangular area, in other words, whether or not xMin>xLn (step S803).

Here, in the case where it is determined in step S803 that the leftmost horizontal pixel location of the current sub-block to be processed has smaller coordinates (Yes in step S803), the coordinates of the pixel location at the left end of the rectangular area is replaced with the coordinates of the leftmost pixel location of the current sub-block to be processed (xMin=xLn) (step S804).

Next, it is determined whether or not the rightmost horizontal pixel location for the current sub-block to be processed has larger coordinates than the rightmost horizontal pixel location of the rectangular area, in other words, whether or not xMax<xRn (step S805).

Here, in the case where it is determined in step S805 that the rightmost horizontal pixel location of the current sub-block to be processed has larger coordinates (Yes in step S805), the coordinates of the pixel location at the right end of the rectangular area is replaced with the coordinates of the rightmost pixel location of the current sub-block to be processed (xMax=xRn) (step S806).

Next, it is determined whether or not the topmost vertical pixel location of the current sub-block to be processed has smaller coordinates than the topmost vertical pixel location of the rectangular area, in other words, whether or not yMin>yTn (step S807).

Here, in the case where it is determined in step S807 that the topmost vertical pixel location of the current sub-block to be processed has smaller coordinates (Yes in step S807), the coordinates of the pixel location at the top end of the rectangular area is replaced with the coordinates of the topmost pixel location of the current sub-block to be processed (yMin=yTn) (step S808).

Next, it is determined whether or not the bottommost vertical pixel location of the current sub-block to be processed has larger coordinates than the bottommost vertical pixel location of the rectangular area, in other words, whether or not yMax<yBn (step S809).

Here, in the case where it is determined in step S809 that the bottommost vertical pixel location of the current sub-block to be processed has larger coordinates (Yes in step S809), the coordinates of the pixel location at the bottom end of the rectangular area is replaced with the coordinates of the bottommost pixel location of the current sub-block to be processed (yMax=yBn) (step 5810).

It is determined whether or not processing has been performed on the sub-blocks which are candidates for transmission all at once, in other words, all the sub-macroblock partitions included in one macroblock partition (step S811).

In the case where it is determined in step S811 that processing has not been performed for all the sub-blocks (No in step S811), the next sub-block to be processed is set (step S812), and the sequence returns to the process in step S803.

In the case where it is determined in step S811 that processing has been performed for all the sub-blocks (Yes in step S811), an alignment process to respond to limitations in the unit of transmission from the multi-frame memory, is performed if necessary, as a final process (step S813). Furthermore, step S813 is an unnecessary process in the case where the reference areas of each sub-block are areas that already take into consideration the limitations on the unit transmission.

Step S814 indicates the end of sum area derivation by single-rectangle coordinate derivation. As a result of processing according to the flowchart shown in FIG. 14, the area containing the circles in FIG. 12B, indicated by the heavy border line B6b, is derived as the transmission area. In the examples in FIGS. 12A and 12B, 221 pixels and 270 pixels, respectively, can be derived as the reference area.

Description of the two sum area derivation methods, namely the method using marking and the method using single-rectangle coordinate derivation has been carried out up to this point.

Figure 15A:
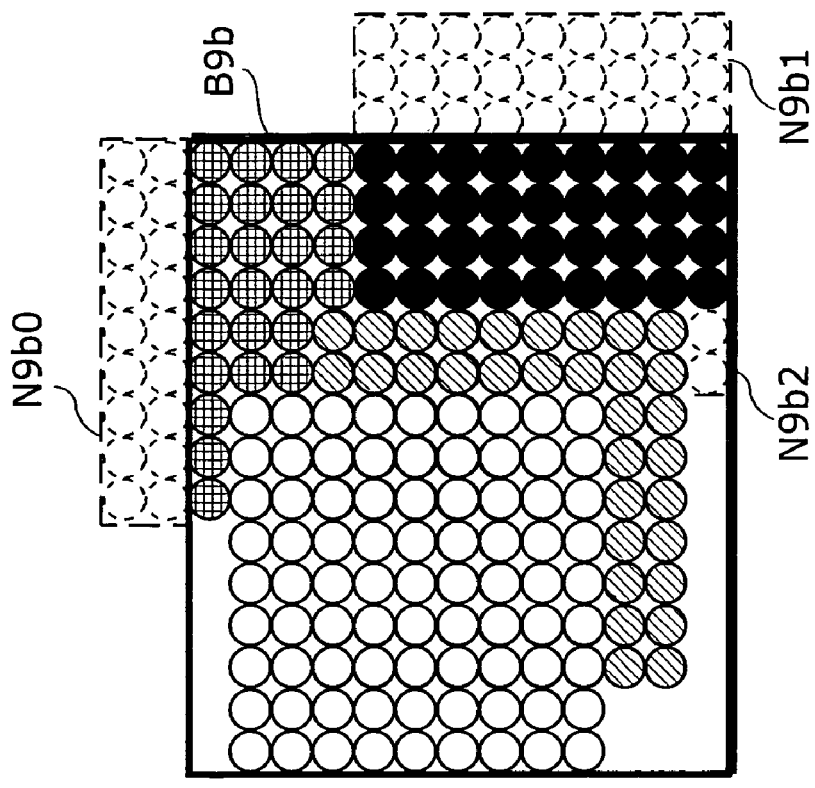
FIG. 15A is a diagram showing the random-shaped sum area of sub-blocks to be transmitted with consideration given to non-referenced sections in filtering.
Figure 15B:
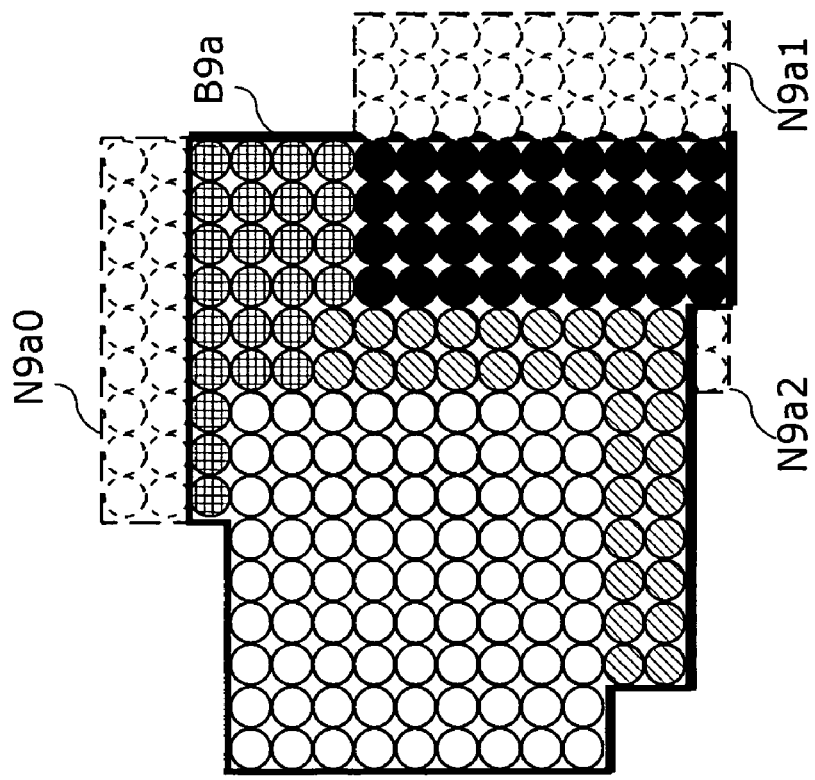
FIG. 15B is a diagram showing the single-rectangular sum area of sub-blocks to be transmitted with consideration given to non-referenced sections in filtering.

Incidentally, in the case where the filtering direction of each sub-block is taken into consideration, transmission area can be reduced. FIGS. 15A and 15B are pattern diagrams representing the appearance of the resulting reduction in the transmission area brought about when the filtering direction is taken into consideration in FIGS. 12A and 12B. FIG. 15A shows the case where sum area derivation is performed by marking and FIG. 15B shows the case where sum area derivation is performed by single-rectangle coordinate derivation.

Areas N9a0, N9a1, N9a2, N9b0 and N9b1 enclosed in broken lines in FIGS. 15A and 15B indicate areas whose transmission can be reduced in comparison with FIGS. 12A and 12B. Area N9b2, likewise enclosed in broken lines, is an area that is not required for transmission but is transmitted as dummy data for the transmission using a rectangular area. Furthermore, heavy border lines B9a and B9b are boundaries indicating the sum area. Hereinafter, details regarding the reduction of the transmission area shall be explained.

FIGS. 15A and 15B each show an example of the case where, in FIG. 11, the reference area of the sub-block including the top-left pixel 512 does not require vertical filtering and the reference area of the sub-block including the top-left pixel 513 does not require horizontal filtering. In the case where vertical filtering is not required, the unneeded, a horizontally-long area in which the top 2 pixel rows and the bottom 3 pixel rows are not required, shown in FIG. 9C, becomes necessary as a transmission area. Furthermore, in the case where horizontal filtering is not required, a vertically-long area in which the left 2 pixel rows and the right 3 pixel rows are not required, shown in FIG. 9D, becomes necessary as a transmission area.

Accordingly, areas excluding areas N9a0, N9a1, N9a2, N9b0 and N9b1 from the areas in FIGS. 15A and 15B serve as the transmission areas, and the pixels within the heavy border lines B9a and B9b are transmitted. In the example, as the number of pixels in areas N9a0, N9a1 and N9a2 are 18, 27 and 2 respectively, and areas N9b0, N9b1 and N9b2 also have 18, 27 and 2 pixels, respectively, 174 pixels can be derived as the transmission area in the example in FIGS. 15A and 195 pixels can be derived as the transmission area in the example in FIG. 15B.

Figure 16B:
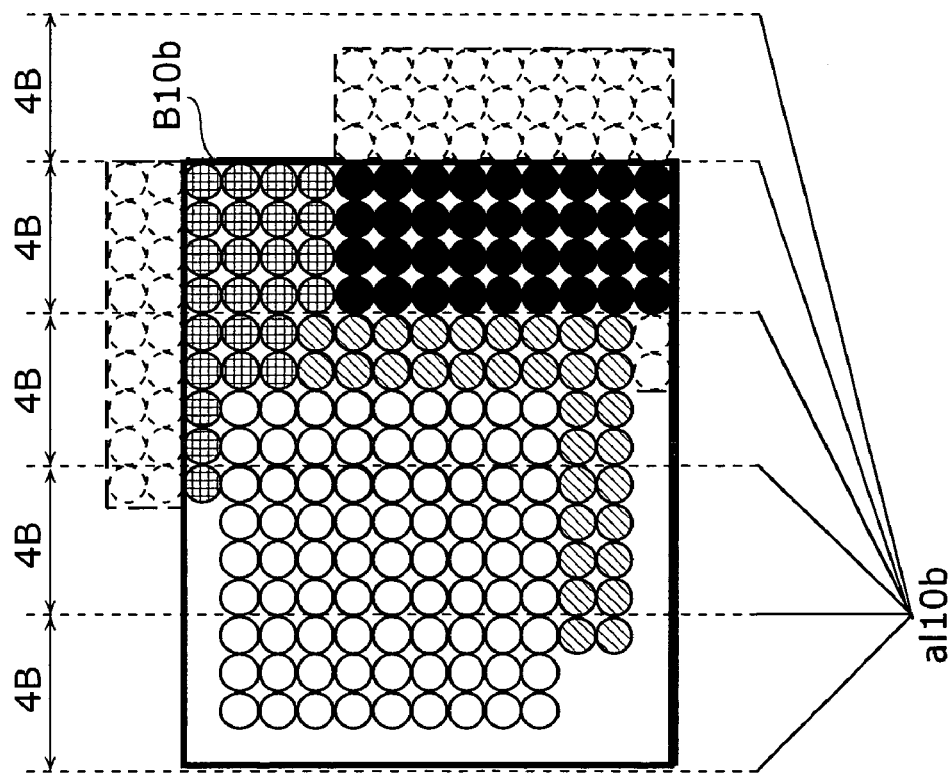
FIG. 16B is a diagram showing the single-rectangular sum area of sub-blocks to be transmitted in view of limitations resulting from 4-byte unit transmission.
Figure 16A:
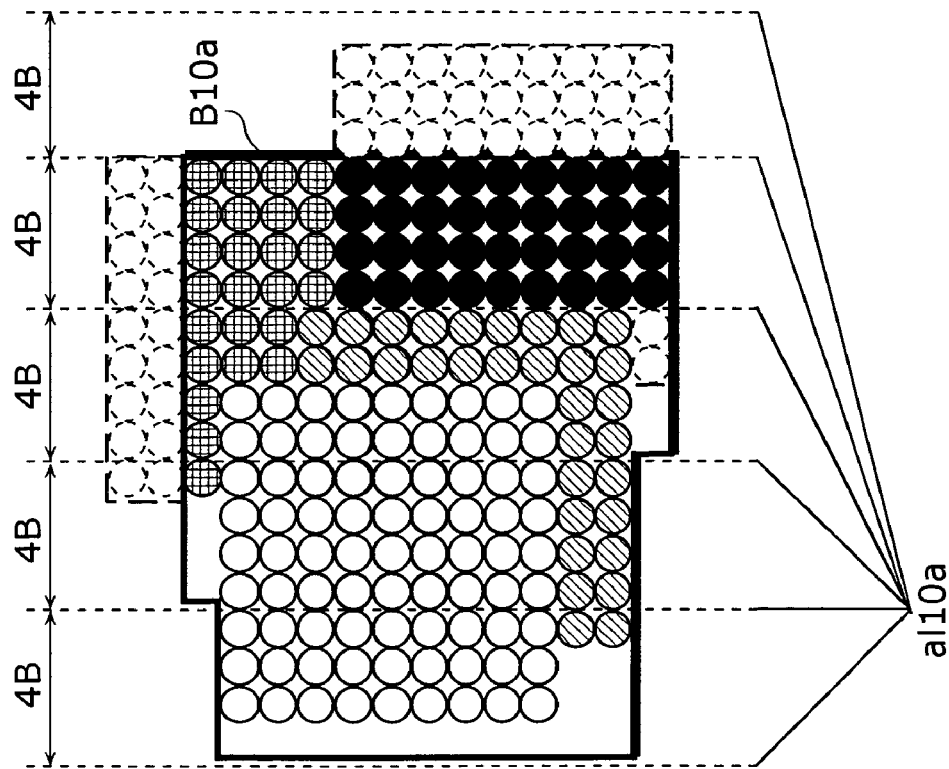
FIG. 16A is a diagram showing the random-shaped sum area of sub-blocks to be transmitted in view of limitations resulting from 4-byte unit transmission.

FIGS. 16A and 16B are pattern diagrams representing the appearance of the case where there is a limitation on the number of pixels in a unit of transmission for the transmission from the multi-frame memory 104, with respect to FIGS. 15A and 15B. FIG. 16A shows the case where sum area derivation is performed by marking and FIG. 16B shows the case where sum area derivation is performed by single-rectangle coordinate derivation.

Broken lines al10a and al10b show the cut-offs for the units of transmission in the case where there is a limitation on the number of pixels in a unit of transmission. This example shows the case where 4 pixels in the horizontal direction serve as a unit of transmission.

Furthermore, heavy border lines B10a and B10b are boundaries indicating the sum areas. At this time, 196 pixels can be derived as the transmission area in FIG. 16A and 208 pixels can be derived as the transmission area in FIG. 16B.

In any of the cases in 15A, 15B, 16A and 16B, derivation is possible using the flowcharts shown in FIG. 10, FIG. 13 and FIG. 14.

Thus, the process for calculating the sum area in which the reference pixels of a plurality of sub-blocks are gathered is as previously described.

Next, the threshold value used by the frame memory transmission control unit 101 shall be explained.

First, according to the calculation for the area of the reference pictures of sub-blocks shown in FIG. 10, the number of pixels for each sub-block can be derived by calculating (xRn−xLn+1)* (yBn−yTn+1). Next, the sum total of the calculation results for all the sub-blocks is calculated and to serve as the threshold value. With this threshold value, it is possible to determine which between (i) transmitting, all at once, the sum area which puts together the reference pixels of a plurality of sub-blocks, and (ii) transmitting the reference areas in parts according to the respective sub-blocks, allows for the smallest transmission amount. Moreover, this threshold value can also be included with a variable such as a penalty in the byte alignment, for example, arising from the partitioning during the access of the multi-frame memory 104.

Furthermore, aside from this, the threshold value can also be a value of the memory capacity of the local reference memory 102, itself. For example, in order to respond to a 16×16 block size motion compensation, it can be presumed that the local reference memory 102 has the memory capacity for (16+6−1)×(16+6−1)=441 pixels. Therefore, such 441 pixels, and the like, can be used as the threshold value.

Next, explanation shall be made regarding the storage, into the local reference memory 102, of the motion compensation reference pixels MCpel1 read from the multi-frame memory 104.

Figure 17A:
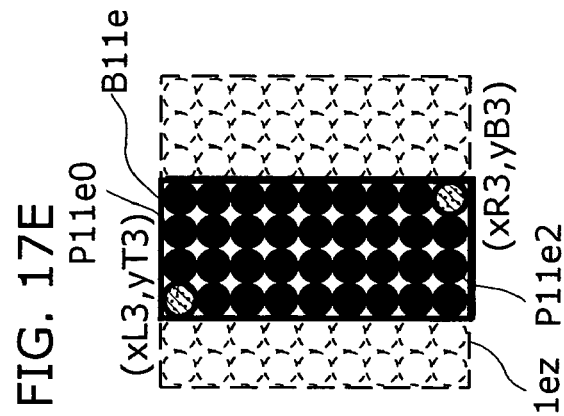
FIG. 17A is a diagram showing the valid reference area of transmitted reference pixels.
Figure 17B:
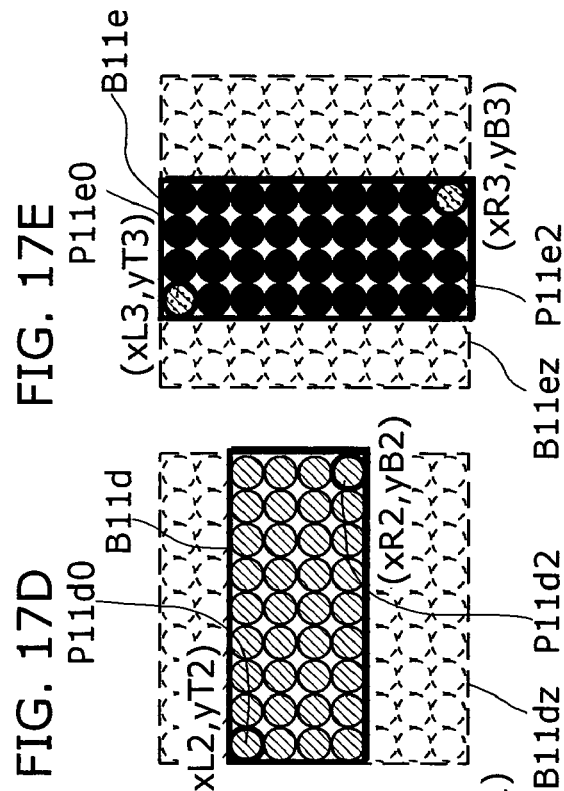
FIG. 17B is a diagram showing reference pixels having (xL0, y T0) as top-left pixel.
Figure 17C:
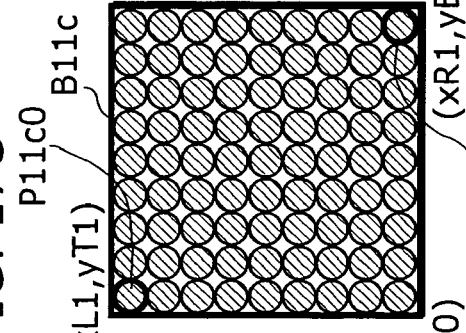
FIG. 17C is a diagram showing reference pixels having (xL1, y T1) as top-left pixel.
Figure 17D:
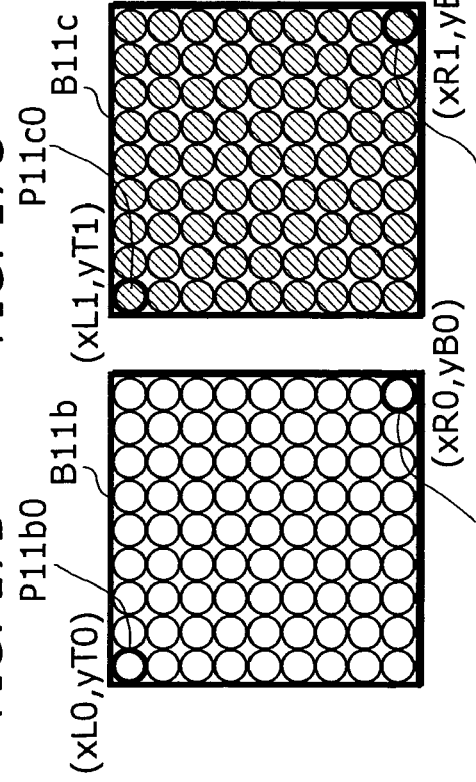
FIG. 17D is a diagram showing reference pixels having (xL2, y T2) as top-left pixel.
Figure 17E:
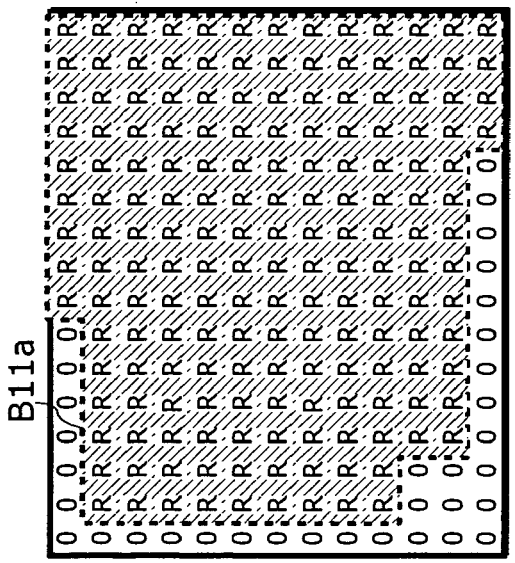
FIG. 17E is a diagram showing reference pixels having (xL3, y T3) as top-left pixel.

FIGS. 17A to 17E are pattern diagrams for explaining the method for storing into the local reference memory 102 in the case where the pixel area shown in FIG. 16B is transmitted. FIG. 17A is a pattern diagram for explaining the case where the reference area is stored all at once. Area B11a enclosed in broken lines indicates the pixels that are actually required for motion compensation, and can be determined similarly using the flow in the transmission area calculation by marking shown in FIG. 13.

FIGS. 17B to 17E are pattern diagrams for explaining the case where the reference area is stored on a per sub-block basis. Pixels P11b0 and P11b2, pixels P11c0 and P11c2, pixels P11d0 and P11d2, as well as pixels P11e0 and P11e2, each represent the top-left and the bottom-right pixel locations of reference areas of sub-blocks. The top-left reference pixel locations are (xL0, yL0), (xL1, yL1), (xL2, yL2), and (xL3, yL3), as indicated in FIG. 11.

Areas B11b, B11c, B11d and B11e show the pixels that are actually required for motion compensation. Areas B11dz and B11ez each show pixel areas required in the case where filtering for sub-pixel precision motion compensation in both the vertical and horizontal directions is required.

Following the flowchart shown in FIG. 8, the motion compensation reference pixels MCpel1 read from the multi-frame memory 104 is stored unconditionally, in the local reference memory 102, in the states shown in FIGS. 17B to 17E, in the case of transmission on a per sub-block basis.

Furthermore, in the case where the likewise-read motion compensation reference pixels MCpel1 is transmitted all at once for a plurality of sub-blocks, there exist a method for storing in the collective state shown in FIG. 17A, and a method for storing pixels spread out on a per sub-block basis, shown in FIGS. 17B to 17E, like in the case where transmission is performed individually for each sub-block.

The advantage of spreading-out storage in the memory into parts is that the control of the filtering for the creation of sub-pixel precision pixels, when the reference pixels MCpel3 is read from the local reference memory 102, can be performed as in the conventional manner. On the other hand, in the case of storing all at once, in a collective state, there is the advantage of further process reduction by processing the subsequent filtering operations also all at once. At this point, by not storing the entire motion compensation reference pixels MCpel1 and storing only the pixels required for referencing in either of the cases, unnecessary memory access can be reduced.

As explained above, according to the inter-picture prediction decoding apparatus in the first embodiment, the multi-frame memory transmission control unit 101 derives the sum area in the case where sub-blocks are to be transmitted all at once, and controls whether to transmit all at once or to transmit as individual sub-blocks, according to the result of comparing the number of pixels in the sum area and the threshold value. With this, although the worst value for the number of transmission pixels is not reduced when viewed in macroblock units, it is possible to drastically lower the average transmission volume as a whole.

As transmission of four 4×4 sub-blocks requiring a 6-tap filter is assumed in the example described above, in the case where there is a 4-byte transmission limit, the reference pixel transmission volume of ((ceil ((4+6−1)/4)×4)×4)×4=768 pixels can be reduced up to a transmission volume of 16×13=208 pixels in the condition in FIG. 16B.

Furthermore, in conjunction, as only the required pixel data of the motion compensation reference pixels MCpel1 transmitted from the multi-frame memory 104, is stored in the local reference memory 102, the processing volume of the motion compensation operation process, as a whole, can be reduced.

Second Embodiment

In continuing, the inter-picture prediction decoding apparatus using the motion compensation apparatus in the second embodiment of the present invention shall be explained.

Figure 18:
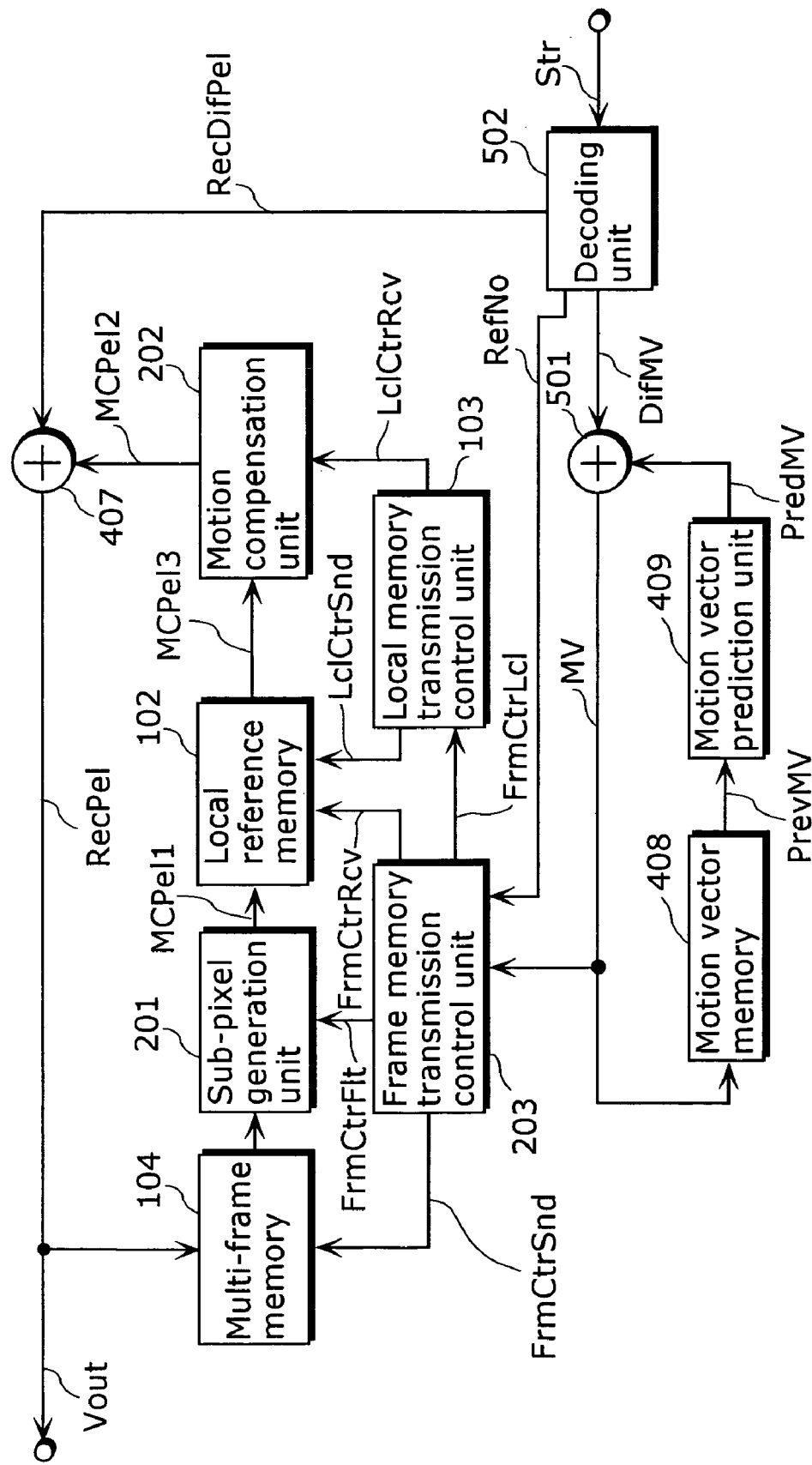
FIG. 18 is a block diagram showing the outline structure of the inter-picture prediction decoding apparatus using the motion compensation apparatus in the second embodiment of the present invention.

FIG. 18 is a block diagram showing the structure of the inter-picture prediction decoding apparatus using the motion compensation apparatus in the second embodiment of the present invention. Furthermore, parts that are the same as those in the conventional inter-picture prediction decoding apparatus shown in FIG. 7 are assigned the same symbols and their descriptions are omitted.

The inter-picture prediction decoding apparatus according to the second embodiment of the present invention includes a sub-pixel generation unit 201 in addition to the structure of the inter-picture prediction decoding apparatus in the first embodiment.

The sub-pixel generation unit 201 is a filter, located between the multi-frame memory 104 and the local reference memory 102, which generates a sub-pixel precision motion compensation image. The sub-pixel generation unit 201 performs filtering in the direction in which the motion compensation reference pixels MCpel1 sent from the multi-frame memory 144 is lined up, in other words, it performs filtering, for the sub-blocks, in one of the horizontal or vertical directions, in which the pixels are successively sent. The timing for the operation of the sub-pixel generation unit 201 is controlled using a signal "FrmCtrFlt" from the frame memory transmission control unit 203.

The sub-pixel generation unit 201 outputs, to the local reference memory 102, filtered sub-pixel precision motion compensation pixels and the original motion compensation reference pixels MCpel1, as pixels "MCpel4". Furthermore, the motion compensation unit 202 performs the motion compensation pixel generation processing other than the filtering in the direction carried out by the sub-pixel generation unit 201.

Hereinafter, explanation shall be made mainly regarding the operation of the local memory transmission control unit 103, as a detailed operation regarding the inter-picture prediction decoding apparatus in the second embodiment. Operations other than those of the sub-pixel generation unit 201, the local reference memory 102, the frame memory transmission control unit 203, the local memory transmission control unit 204 and the motion compensation unit 202, are the same as those in the first embodiment. In the second embodiment, the case where the transmission area including the reference area of the sub-blocks is transmitted all at once is assumed for the motion compensation reference pixels MCpel1.

Figure 19:
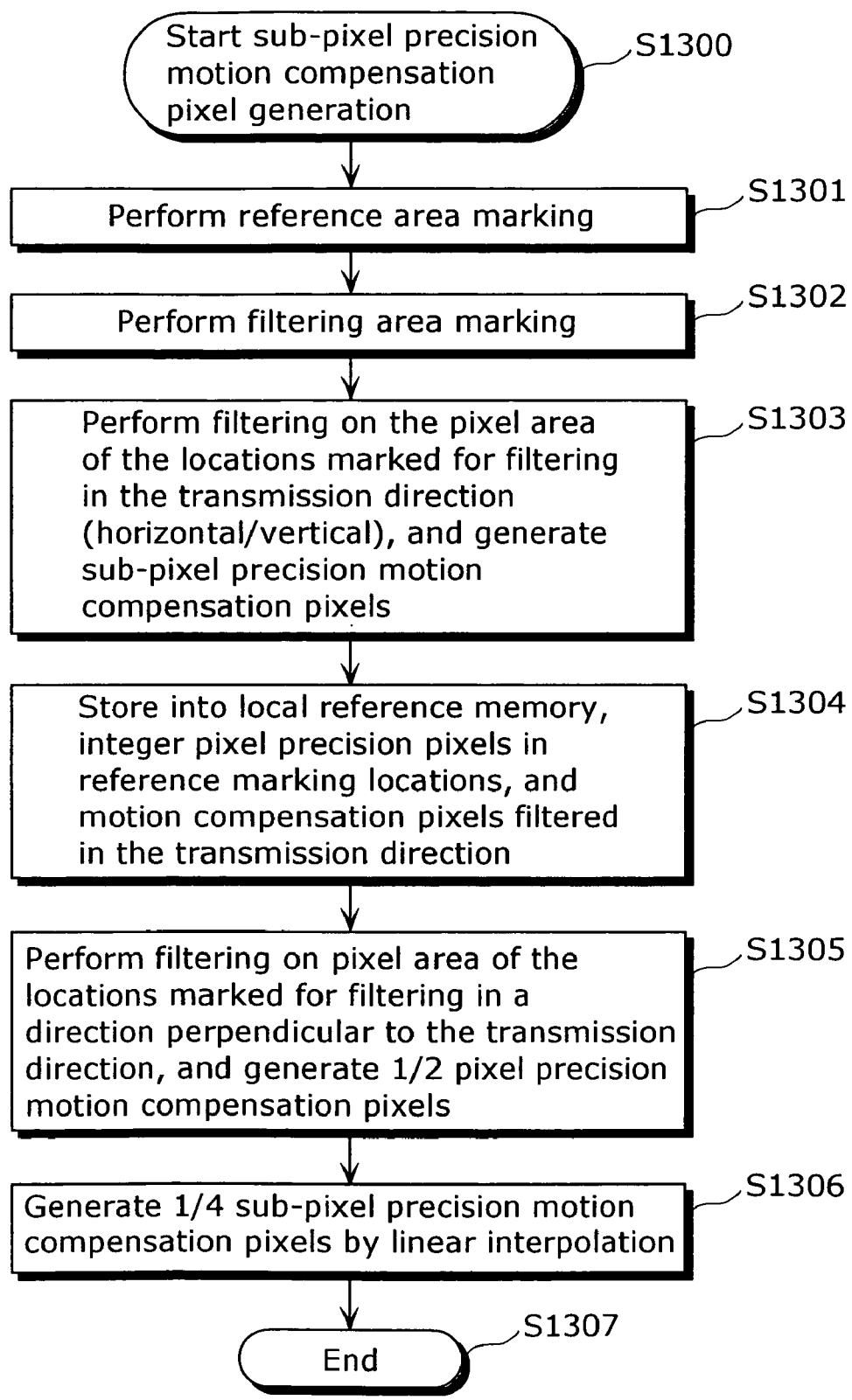
FIG. 19 is a flowchart showing the flow of operation in sub-pixel precision motion compensation pixel generation.

FIG. 19 is a flowchart showing the flow of operations in the sub-pixel precision motion compensation pixel generation process. The flowchart in FIG. 19 shows a procedure for performing sub-pixel precision motion compensation effectively by switching the process depending on whether the units of transmission for the motion compensation reference pixels MCpel1 from the multi-frame memory 104 are transmitted on a per sub-block basis or as an interconnected sum area.

Step S1300 indicates the start of the sub-pixel precision motion compensation pixel generation process.

First, the frame memory transmission control unit 203 determines, within the transmission area, the pixels actually required in referencing (step S1301). This is done through the same method as in the flowchart for sum area derivation by marking, shown in FIG. 13.

Next, the frame memory transmission control unit 203 performs, in each of the horizontal and vertical directions, the derivation of the areas to be performed of horizontal and vertical filtering (step S 1302). Here, the respective results shall be referred to as a horizontal filter map and a vertical filter map.

Next, with respect to the motion compensation reference pixels MCpel1 received from the multi-frame memory 104, the sub-pixel generation unit 201 performs filtering, according to the horizontal filter map or the vertical filter map, on the line of pixels in the direction of transmission. The filtering is performed only on those parts which are required for the generation of the motion compensation image of any of the sub-blocks (step S1303).

Together with the motion compensation reference pixels MCpel1, the pixels filtered by the sub-pixel generation unit 201 are outputted to the local reference memory 102 as the pixels MCpel4 and stored in the local reference memory 102 (step S1304).

Next, with respect to reference pixels MCpel3 received from the local reference memory 102, the motion compensation unit 202 (i) performs filtering in a direction that is perpendicular to the direction of the filtering performed in step S1303, according to the vertical filter map or horizontal filter map, and (ii) performs half-pixel precision reference pixel generation (step S1305).

Finally, the motion compensation unit 202 performs quarter-pixel precision reference pixel generation using linear interpolation, and outputs these as reference image pixels MCpel2 (step S1306). Filtering is performed on a per sub-block basis when necessary. Including the half-pixel precision pixel generation, in cases where integer precision motion compensation is not required, filtering is not performed.

Step S1307 indicates the end of the sub-pixel precision motion compensation pixel generation process. Even in the case where individualized pixel transmission for each sub-block is being carried out from the multi-frame memory 104, it is possible to perform the sub-pixel precision motion compensation pixel generation process according to the flowchart in FIG. 19.

Figure 20C:
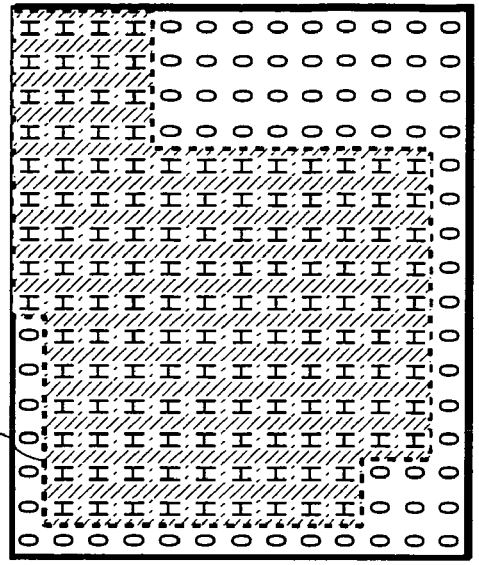
FIG. 20C is a diagram showing the horizontal filtering valid pixel area.
Figure 20A:
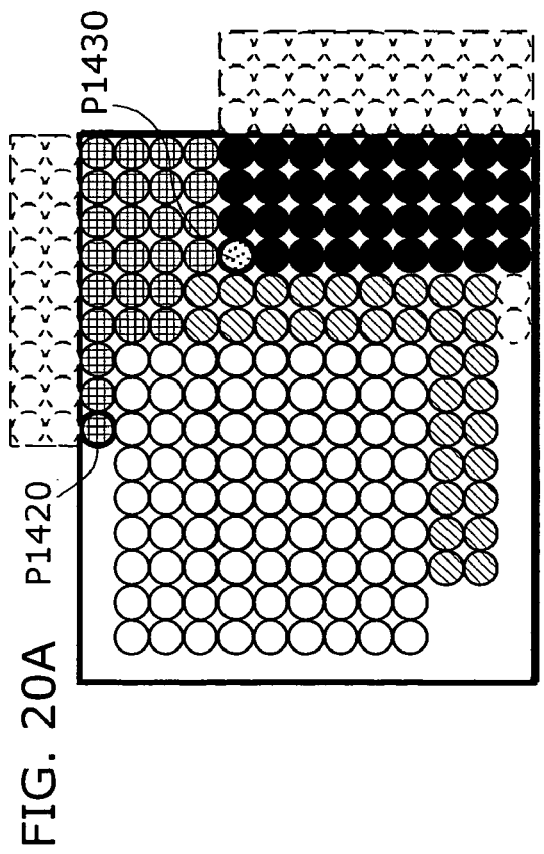
FIG. 20A is a diagram showing the valid pixel area of transmitted reference pixels.
Figure 20B:
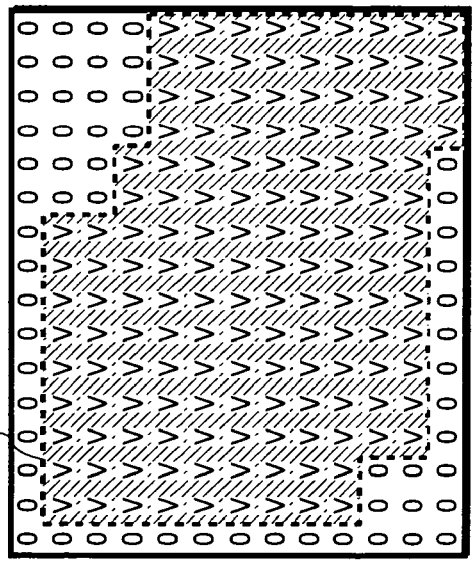
FIG. 20B is a diagram showing the vertical filtering valid pixel area.

Next, the derivation of the areas on which horizontal and vertical filtering are to be performed shall be explained in detail using FIGS. 20A to 20C and FIG. 21. FIGS. 20A to 20C are pattern diagrams for explaining the marking process with respect to the pixels to be filtered. FIG. 21 shows the flowchart for such marking process.

FIG. 20A shows the same condition as FIG. 16B, and pixels P1420 and P1430 represent pixel locations (xL2, yT2) and (xL3, yT3) respectively. The reference areas having pixels P1420 and P1430 as top-left pixels are those made up of pixels represented by circles filled with crisscross lines, and pixels represented by blacked-out circles, respectively.

Furthermore, FIGS. 20B and 20C represent a vertical filter map and a horizontal filter map, respectively. Each slanted line area enclosed by broken heavy border lines B14b and B14c indicates an area where filtering is to be performed.

The procedure for the marking of the area to be filtered, performed by the frame memory transmission control unit 203 shall be explained using FIG. 21. Step S1500 indicates the start of the marking process.

First, the horizontal filter map and the vertical filter map are initialized (step S1501). For example, the flags for all the pixel locations are set to "0".

The first sub-block for processing is set (step S1502).

It is determined whether or not the current sub-block requires horizontal filtering (step S1503). In the case where horizontal filtering is not required (No in step S1503), the sequence moves to step S1505.

On the other hand, in the case where it is determined in step S1503 that horizontal filtering is required (Yes in step S1503), the flags in the horizontal filter map, for the pixel locations being referred to by the current sub-block are raised (step S1504). For example, "H" flags are raised, as shown in FIG. 20C.

Next, it is determined whether or not the current sub-block requires vertical filtering (step S1505). In the case where vertical filtering is not required (No in step S1505), the sequence moves to step S1507.

On the other hand, in the case where it is determined in step S1505 that vertical filtering is required (Yes in step S1505), the flags in the vertical filter map, for the pixel locations being referred to by the current sub-block are raised (step S1506). For example, "V" flags are raised, as shown in FIG. 20B.

It is determined whether or not marking has been performed for all the sub-blocks transmitted all at once (step S1507). In the case where processing has been performed for all the sub-blocks (Yes in step S1507), the marking process for horizontal and vertical filtering is concluded (step S1509).

On the other hand, in the case where it is determined in step S1507 that processing has not been performed for all the sub-blocks (No in step S1507), the next sub-block to be processed is set (step S1508).

Through the performance of the aforementioned process, it is possible to derive the area in the case where horizontal and vertical filtering is performed all at once for a plurality of sub-blocks. In the example shown in FIGS. 20A to 20C, as it is assumed that the reference area having pixel P1420 as the top-left pixel does not require vertical filtering, it is recognized that the pixel area indicated by the crisscrossed circles is the section not requiring vertical filtering, and that vertical filtering should be performed on the slanted-line area enclosed by the broken heavy border line B14b in FIG. 20B. Furthermore, as it is assumed that the reference area having pixel P1430 as the top-left pixel does not require horizontal filtering, it is recognized that the pixel area indicated by the blackened-out circles is the section not requiring horizontal filtering, and that horizontal filtering should be performed on the slanted-line area enclosed by the broken heavy border line Bl4c in FIG. 20C.

By adopting the structure shown in the second embodiment, process cycle and process volume reduction become possible as filtering for sub-pixel precision motion compensation prediction is carried out, not on a per sub-block basis, but all at once for a plurality of sub-blocks, and filtering is selectively performed on the required locations only. Furthermore, in conjunction, further process cycle reduction is made possible as filtering in one-direction is performed midway through the transmission from the multi-frame memory 104.

Third Embodiment

In continuing, the third embodiment of the present invention shall be explained.

Figure 22:
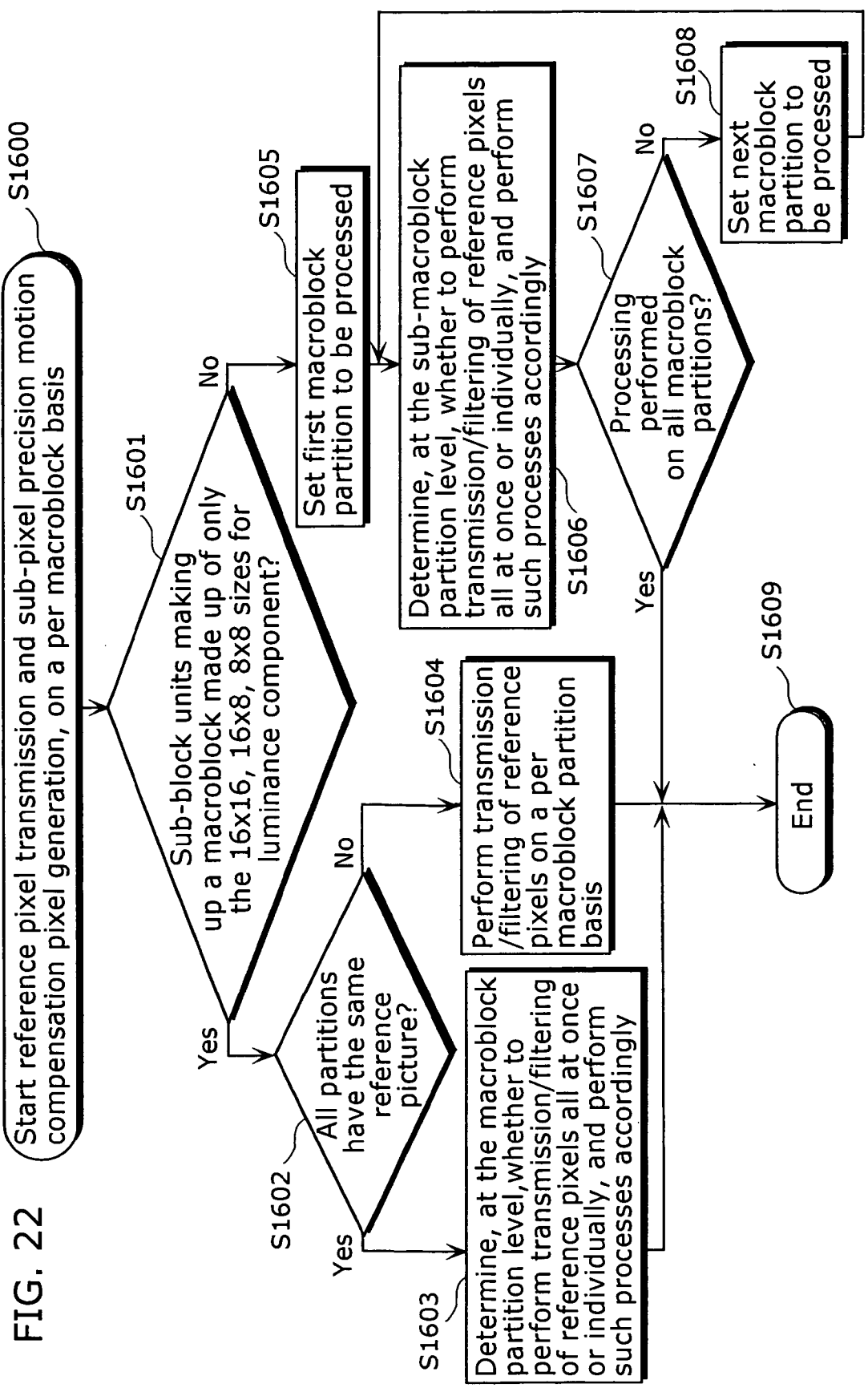
FIG. 22 is a flowchart showing the flow of operation of the inter-picture prediction decoding apparatus using the motion compensation apparatus in the third embodiment of the present invention.

FIG. 22 is a flowchart showing the flow of operation for the inter-picture prediction decoding apparatus using the motion compensation apparatus in the third embodiment of the present invention. In the third embodiment, an example of the process sequence in an application on a macroblock level in the H.264 specification shall be explained.

In the case of macroblock partition type with 16×16, 16×8, 8×16 and 8×8 block sizes, it is possible, in the H.624 specification, for each partition to have a different picture as a reference picture. Accordingly, partitions referring to the same picture are determined, and in the case where the reference picture of the macroblock partitions is the same, it is sufficient to carry out the same process as in the sub-macroblock level. In other words, the same reduction of accesses to the multi-frame memory 104 and reduction of the generation of motion compensation pixels, as in the first and second embodiments is also possible on the macroblock level.

Hereinafter, the flow of control for reference pixel transmission and motion compensation for a macroblock shall be explained using FIG. 22. Step 1600 indicates the start of the controlling process.

First, it is determined whether or not the sub-blocks making up a macroblock are made up of only the 16×16, 16×8, 8×16 or 8×8 partition types (step S1601).

In the case where it is determined in step S1601 that the sub-blocks are made up of only the 16×16, 16×8, 8×16 or 8×8 partition types (Yes in step S1601), it is determined whether or not all of the sub-blocks refer to the same frame (step S1602).

In the case that it is determined in step S1602 that all of the sub-blocks have the same reference frame (Yes in step S1602), it is determined, in the macroblock level, whether to perform reference pixel transmission and motion compensation pixel generation all at once or individually, and such processes are carried out accordingly (step S1603).

Furthermore, in the case where it is determined in step S1602 that the respective sub-blocks have different reference frames (No in step S1602), the conventional individualized reference picture transmission and individualized motion compensation pixel generation is carried out (step S1604).

On the other hand, in the case where it is determined in step S1601 that the sub-blocks are not made up of only the 16×16, 16×8, 8×16 or 8×8 partition types (No in step S1601), first, as processing is to be carried out on a per macroblock partition basis, the macroblock partition to be processed first is set (step S1605).

With regard to the macroblock partition that has been set, it is determined, in the sub-macroblock partition level, whether to perform reference pixel transmission and motion compensation pixel generation all at once or individually, and such processes are carried out accordingly (step S1606).

Next, it is determined whether processing has been carried out for all of the macroblock partitions (step S1607).

In the case where it is determined in step S1607 that processing for all of the macroblock partitions is not finished (No in step S1607), the process is set for the next macroblock partition and step S1606 and S1607 are repeated (step S1608).

Step S1609 indicates the conclusion of the reference pixel transmission and motion compensation pixel generation processes in the macroblock.

By processing according to the sequence described above, reduction of accesses to the multi-frame memory 104 and reduction of filtering process volume for reference pixel transmission and motion compensation pixel generation can be applied even with respect to processing in the macroblock level.

Although explanation regarding the inter-picture prediction decoding apparatus in the present invention has been carried out based on the respective embodiments, the present invention is not limited to these embodiments, and it is possible to carry out various design modifications within the scope of the present invention.

For example, in the apparatus and technique shown in the first to third embodiments, the sub-blocks in the case where transmission is performed all at once, need not necessarily be all of the sub-blocks divided as the units of motion compensation. For example, in the case of a 4×4 sub-macroblock partition type, although the build up of 4 sub-macroblock partitions make up 1 macroblock partition, a collective transmission and filtering can also be carried out only on 2 of the sub-macroblocks.

Furthermore, in the apparatus and technique shown in the first to third embodiments, the sub-blocks in the case where transmission is performed all at once can also be randomly selected from a plurality of macroblock partitions and macroblocks.

In addition, the apparatus and technique shown in the first to third embodiments can also be applied in a picture coding apparatus and technique.

Furthermore, each function block of the block diagrams shown in FIG. 7 and FIG. 18 are typically implemented as an LSI which is an integrated circuit. Such LSI can be implemented in the form of a single chip or a plurality of chips (for example, function blocks other than the memory can be implemented in single-chip form). Although, referred to as LSI here, they may also be referred to as an IC, system LSI, super LSI, and ultra-LSI, depending on the degree of integration.

Furthermore, the technique for implementation as an integrated circuit is not limited to the LSI, and implementation through a purpose-built circuit or a general-purpose processor is also possible. It is also possible to use a Field Programmable Gate Array (FPGA) which can be programmed, and a reconfigurable processor in which connections and settings of circuit cells within an LSI can be reconfigured, after the manufacturing of the LSI.

In addition, when integrated circuit technology replacing the LSI appears as a result of developments in semiconductor technology or as an offshoot of different technology, it goes without saying that integration of the function blocks can be carried out using such technology. Application in biotechnology and so on, is also not discounted as a possibility.

Furthermore, it is also possible to have a different structure which does not implement in the single-chip form only units, like the multi-frame memory 104, that store data referred to during coding and decoding, among the respective function blocks.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

The motion compensation apparatus in the present invention is useful for generating motion compensation pixels effectively, generating a coded stream by coding respective pictures making up a moving picture, and decoding the generated coded stream, and so on, in a content distribution apparatus, a digital broadcast apparatus, a mobile phone, a DVD apparatus, a personal computer, for example, and so on.

What is claimed is:

1. A motion compensation apparatus that performs motion compensation for a target picture, on a block-by-block basis, between the target picture and a reference picture which make up a moving picture, the apparatus comprising:
    a local memory configured to store reference pixel data of a partial area of the reference picture transmitted from a picture memory, the local memory being independent of the picture memory storing the reference picture;
    an area identifier configured to identify, from within the reference picture stored in the picture memory, a transmission area as the partial area, the transmission area including a reference area required in motion compensation of a block or plural blocks included in the target picture;
    a reference pixel transmitter configured to transmit, from the picture memory to the local memory, the reference pixel data of the transmission area identified by the area identifier from within the reference picture stored in the picture memory; and
    a motion compensator configured to perform motion compensation on the plural blocks, using the reference pixel data of the reference area included in the transmission area stored in the local memory,
    wherein the reference pixel transmitter is configured to (i) transmit all at once the reference pixel data of the transmission area including the reference area required in motion compensation of the plural blocks in a case where the number of pixels in the transmission area does not exceed a predetermined threshold value, and (ii) transmit, individually for each of the plural blocks, the reference pixel data of the transmission area including the reference area referred to in the motion compensation of each of the plural blocks in a case where the number of pixels in the transmission area exceeds the predetermined threshold value.

2. The motion compensation apparatus according to claim 1, wherein the local memory is referred to only by the motion compensator.

3. The motion compensation apparatus according to claim 1,
    wherein the reference pixel transmitter is configured to judge whether or not the plural blocks refer to a same reference picture, and to transmit the reference pixel data of the transmission area individually, for each of the plural blocks in the case where the same reference picture is not referred to.

4. The motion compensation apparatus according to claim 1,
    wherein the predetermined threshold value is a value which is ,a sum of the number of pixels in respective areas for each of the plural blocks which are candidates for processing all at once, the respective areas including (i) a reference area required in motion compensation, and (ii) an unnecessary area which is not required in motion compensation due to a limitation on a unit of transmission between the picture memory and the local memory but is transmitted simultaneously with the reference area.

5. The motion compensation apparatus according to claim 1, wherein the predetermined threshold value is a capacity of the local memory.

6. The motion compensation apparatus according to claim 3,
    wherein the reference pixel transmitter is configured to judge that the plural blocks refer to a same reference picture in the case where a block size of the plural blocks is a size of a sub-marcoblock partition type.

7. The motion compensation apparatus according to claim 1,
    wherein the area identifier is configured to identify at least one rectangular area as the transmission area.

8. The motion compensation apparatus according to claim 1,
    wherein the local memory stores only the reference pixel data of the reference area included in the transmission area transmitted from the picture memory.

9. The motion compensation apparatus according to claim 1,
    wherein the reference pixel transmitter is configured to transmit, in a unit of transmission between the picture memory and the local memory, the reference pixel data of the transmission area.

10. A motion compensation method for performing motion compensation for a target picture, on a block-by-block basis, between the target picture and a reference picture which make up a moving picture, the method comprising:
    storing, in a local memory, reference pixel data of a partial area of the reference picture transmitted from a picture memory, the local memory being independent of the picture memory storing the reference picture;
    identifying, from within the reference picture stored in the picture memory, a transmission area as the partial area, the transmission area including a reference area required in motion compensation of a block or plural blocks included in the target picture;
    transmitting, via a reference pixel transmitter, from the picture memory to the local memory, the reference pixel data of the transmission area identified by the area identifying step from within the reference picture stored in the picture memory; and
    performing, via a motion compensator, motion compensation on the plural blocks, using the reference pixel data of the reference area included in the transmission area stored in the local memory,
    wherein the transmitting step (i) transmits all at once the reference pixel data of the transmission area including the reference area required in motion compensation of the plural blocks in a case where the number of pixels in the transmission area does not exceed a predetermined threshold value, and (ii) transmits, individually for each of the plural blocks, the reference pixel data of the transmission area including the reference area referred to in the motion compensation of each of the plural blocks in a case where the number of pixels in the transmission area exceeds the predetermined threshold value.

* * * * *